United States Patent [19]
Chliwnyj et al.

[11] Patent Number: 5,872,672
[45] Date of Patent: Feb. 16, 1999

[54] SYSTEM AND METHOD FOR MONITORING AND ANALYZING TAPE SERVO PERFORMANCE

[75] Inventors: Alex Chliwnyj; Colleen Renee Stouffer; Steven Carter Wills, all of Tucson, Ariz.

[73] Assignee: International Business Machines Corporation, Armonk, N.Y.

[21] Appl. No.: 699,761

[22] Filed: Aug. 20, 1996

Related U.S. Application Data

[63] Continuation-in-part of Ser. No. 600,914, Feb. 16, 1996.
[51] Int. Cl.$^6$ ................................................ G11B 5/596
[52] U.S. Cl. ............................ 360/77.12; 360/53; 360/69
[58] Field of Search .............................. 360/77.12, 78.02, 360/31, 53, 69; 324/210, 212

[56] References Cited

U.S. PATENT DOCUMENTS

| | | | |
|---|---|---|---|
| 3,704,363 | 11/1972 | Salmassy et al. | 235/153 |
| 4,334,276 | 6/1982 | Turnbull . | |
| 4,833,679 | 5/1989 | Anderson et al. | 371/38 |
| 4,969,139 | 11/1990 | Azumatani et al. | 369/54 |
| 5,121,263 | 6/1992 | Kerwin et al. | 360/53 |
| 5,253,126 | 10/1993 | Richmond | 360/53 |
| 5,331,616 | 7/1994 | Morita et al. | 369/53 |
| 5,353,172 | 10/1994 | Alioth | 360/70 |
| 5,394,280 | 2/1995 | Chliwnyj et al. | 360/77.12 |
| 5,574,602 | 11/1996 | Baca et al. | 360/77.12 |
| 5,629,813 | 5/1997 | Baca et al. | 360/77.12 |

FOREIGN PATENT DOCUMENTS 57-130252  8/1992  Japan .

OTHER PUBLICATIONS

W.L. Harris et al, *IBM Technical Disclosure Bulletin*, vol. 35, No. 1A, Jun. 1992, pp. 269–271.
G.L. Yakkel, Jr., *IBM Technical Disclosure Bulletin*, vol. 19, No. 2, Jul. 1976, p. 401.

*Primary Examiner*—Aristotelis M. Psitos
*Assistant Examiner*—James L. Habermehl
*Attorney, Agent, or Firm*—Gary Cary Ware Freidenrich

[57] ABSTRACT

Servo elements contained within a tape head detect a lateral displacement the magnetic tape relative to the tape head and generate position error signals corresponding to such lateral displacement. To aid in servo monitoring, the position error signals are sampled at predetermined times and the samples output or stored in machine-readable form. Each sample is classified as bad if it exceeds a predetermined threshold. Samples are analyzed to determine, for each time a bad position error signal occurs, how many successive position error signals are also bad. Samples are also analyzed to determine the relationship between bad position error signals samples and total samples. This data may be used for a number of different purposes. For example, this information may be used to identify differences between performance on top and bottom servo edges, or problems with the servo writing mechanism. Performance variations among different servo elements may also be identified. Such data may also be used to help recognize large "dropouts" or "fades" in the tape media. Furthermore, the data may also be analyzed to yield an overall indication of the media surface and edge quality of the media. Importantly, this information may be employed to pinpoint servo read errors, distinguishing between media problems and servo element malfunctions. Data obtained in accordance with the invention may also be used to evaluate tape media, with one possible implementation applying a numerical rank to factory-new tape media and subsequently binning the media according to their numerical ranks.

52 Claims, 17 Drawing Sheets

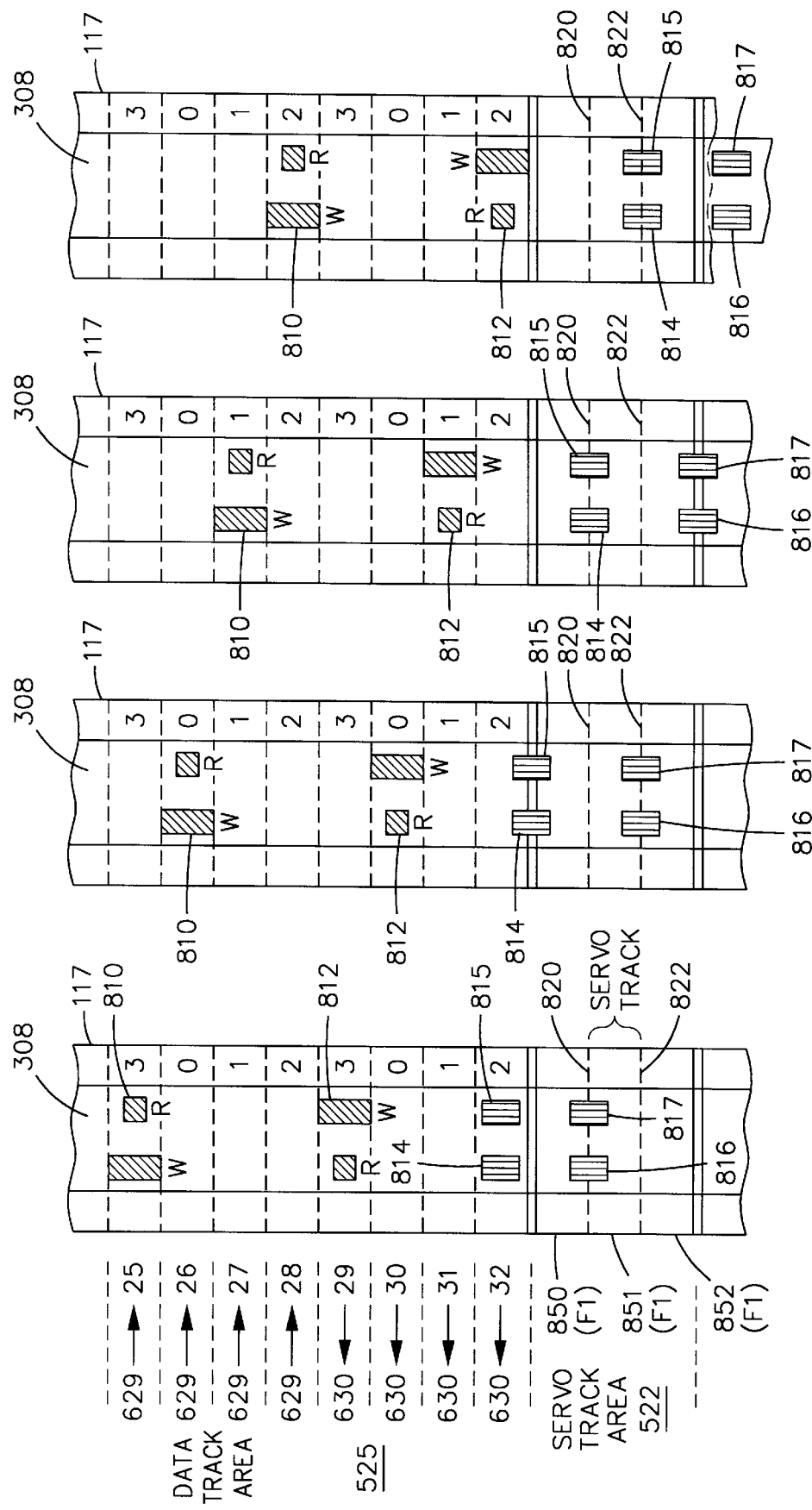

| WRAP HALF | PES #1 | PES #2 | PES #3 | |
|---|---|---|---|---|
| OFFSET = −6 μm: BELOW SERVO TRACK | | | | |
| WH0 | 76 | 32 | 31 | MEAN BAD SAMPLES: 129 |
| WH1 | 82 | 26 | 31 | |
| WH2 | 54 | 23 | 32 | WHS/MBS: 5.646E+03 |
| WH3 | 52 | 26 | 29 | |
| WH4 | 88 | 28 | 51 | |
| WH5 | 89 | 27 | 26 | |
| WH6 | 54 | 2115 | 32 | |
| WH7 | 47 | 25 | 27 | |
| OFFSET = +0 μm: ON SERVO TRACK | | | | |
| WH0 | 547 | 629 | 441 | MEAN BAD SAMPLES: 487 |
| WH1 | 708 | 402 | 500 | |
| WH2 | 403 | 235 | 386 | WHS/MBS: 1.498E+03 |
| WH3 | 417 | 126 | 259 | |
| WH4 | 611 | 411 | 936 | |
| WH5 | 595 | 413 | 608 | |
| WH6 | 535 | 77 | 667 | |
| WH7 | 773 | 297 | 719 | |
| OFFSET = +6 μm: ABOVE SERVO TRACK | | | | |
| WH0 | 3733 | 1947 | 5639 | MEAN BAD SAMPLES: 2824 |
| WH1 | 3676 | 2674 | 4249 | |
| WH2 | 2073 | 1820 | 2907 | WHS/MBS: 2.585E+02 |
| WH3 | 2505 | 1337 | 2707 | |
| WH4 | 2259 | 2002 | 7579 | |
| WH5 | 3082 | 2024 | 2398 | |
| WH6 | 2547 | 879 | 3552 | |
| WH7 | 3009 | 993 | 2174 | |

FIG. 13

SYSTEM AND METHOD FOR MONITORING AND ANALYZING TAPE SERVO PERFORMANCE

CROSS-REFERENCE TO RELATED APPLICATIONS

This application is a continuation-in-part of pending U.S. application Ser. No. 08/600,914, filed on Feb. 16, 1996 in the names of Chliwnyj et al., and assigned to International Business Machines Corporation.

BACKGROUND OF THE INVENTION

1. Field of the Invention

The present invention relates generally to tape drives, which process data on a magnetic tape by passing the tape alongside a tape head. More particularly, the present invention describes an improved servo system for controlling tape head position relative to the magnetic tape, and for detecting, monitoring, and analyzing servo performance as well as servo errors occurring in the servo system.

2. Description of the Related Art

Data processing systems typically require a large amount of data storage. Effective data processing systems efficiently access, modify, and re-store data within their data storage. Data storage is typically provided in several different mediums, each medium characterized by the time to access the data and the cost to store the data. A first type of data storage medium involves electronic memory, usually dynamic or static random access memory (DRAM or SRAM). Electronic memories take the form of semiconductor integrated circuits where millions of bytes of data can be stored on each circuit, with access to such bytes of data measured in nanoseconds. The electronic memory provides the fastest access to data since such access is accomplished at electronic speeds.

A second type of data storage medium involves direct access storage devices (DASD). DASD storage, for example, can comprise magnetic and/or optical disks. The disks are rotatably mounted within a protected environment and data bits are stored as micrometer-sized magnetically or optically altered spots on a disk surface. Each disk is divided into many concentric tracks, or closely spaced circles. The data is stored serially, bit by bit, along each track. Each DASD contains an access mechanism, known as a head disk assembly (HDA), which typically includes one or more read/write heads. The HDA exchanges data with the surface of each disk as the disk rotates relative to a corresponding read/write head. DASDs can store gigabytes of data, with access to such data typically measured in milliseconds (orders of magnitudes slower than electronic memory). Accessing data already stored on DASD is slower because the disk and HDA must be physically advanced to the desired data storage location.

A third type of data storage medium includes tapes, tape libraries, and optical libraries. Access to data is much slower in a library since a robot is needed to select and load the data storage cartridge. An advantage of these storage systems is the reduced cost for very large data storage capabilities, on the order of terabytes of data. For example, gigabytes of data can be stored within an individual magnetic tape cartridge. Tape storage is often used for back-up purposes. That is, data stored on a different storage medium, such as DASD, is reproduced for safe keeping on magnetic tape. Presently, access to data stored on tape and/or in a library requires a time period on the order of seconds.

For many businesses, having a back-up data copy is mandatory since a data loss could be catastrophic to the business. A large volume of back-up data, such as terabytes of data, is generally stored in a tape library. The library accesses data by using a robotic mechanism to select a tape cartridge from an array of storage bins. Once the tape cartridge is loaded into a tape drive within the library, data can be read from or written to the tape cartridge. Increasing the data capacity of a tape reduces the cost of backing up data and improves library efficiency.

In the information storage industry, increases in tape data capacities have been achieved, in part, by increasing tape lengths stored within a cartridge or reel. Increased tape length has been mainly accomplished by producing thinner tape substrates. Additional increases in data capacity are made possible by various data compression techniques, for example, Improved Data Recording Capability (IDRC) by International Business Machines, Company, or Lempel-Ziv data compression by Stac Electronics, Inc. Data compression techniques can increase data density by two to five times over non-compressed data.

Advances in magnetic tape media and tape head technologies have generated further increases in data capacity by increasing the number of tracks on a magnetic tape (by narrowing a width of each track), as well as the number of read/write elements on the tape head. An eighteen-track tape for data storage has been a standard for many years. More recently, an IBM 3490-E magnetic tape subsystem for 12.7 mm (½ inch) wide tape employs a head element with thirty-six read/write elements and has a tape capacity of 800 megabytes. Data compression techniques can further increase the tape capacity to two or more gigabytes. The 3490-E magnetic tape subsystem performs bi-directional linear recording, as opposed to helical scan recording. By interleaving sets of head elements, the number of tape rewinds is reduced, and performance is improved accordingly. In an interleaved head, element pairs having a read-element/write-element configuration (when viewed towards the face of the head) alternate with element pairs having an opposite write-element/read-element configuration, each pair of elements being associated with one track on the tape. When the tape travels in a first direction, the element pairs having one configuration access the corresponding tracks (such as the even numbered tracks) in a read-after-write manner. Conversely, when the tape travels in an opposite direction, those element pairs having the other configuration access the other corresponding tracks (such as the odd numbered tracks), also in a read-after-write manner. This read-after-write technique may be used to immediately verify that data has been correctly written to the tape, free from any errors.

To further enhance performance, this interleaved head element configuration can be implemented in storage systems that use tape having a large number of tracks. This combination may be implemented using a tape head having an equally large number of closely spaced elements. The 3490-E tape head is an example of one tape head with a magneto-resistive transducer formed through thin film deposition techniques.

Historically, the number of tracks that could be established on the tape media has been limited by the number of corresponding elements that could be fabricated on a tape head. Subsequently, however, tape heads have been designed with fewer sets of read/write elements than the number of tracks on the tape, with the idea of transversely moving the tape head relative to the tape. Advantageously the read/write elements of these tape heads are more densely distributed than in the past, facilitating greater track density on the tape.

In this arrangement the tracks are divided into groups, each group containing the same number of tracks as there are read/write element pairs in the head. Accessing all the groups requires indexing the head transversely relative to the tape path, such as with a stepper motor or voice coil driven springs, into a number of discrete positions corresponding to the number of groups of tracks. A head having eight read/write pairs, for example, can accommodate a tape having thirty-two tracks if the tracks are divided into four groups of eight tracks each and the head has four index positions. The distance of head travel between index positions is minimized by interleaving the groups. For example, each of the four groups containing eight tracks (consecutively numbered 0–31) results in tracks 0, 4, 8 . . . , and 28 being in the first group and accessible by the head being indexed to position zero. Similarly, tracks 1, 5, 9, . . . , and 29 are in the second group, accessible in index position one; tracks 2, 6, 10, . . . , and 30 are in the third group, accessible in index position two; and tracks 3, 7, 11, . . . , and 31 are in the fourth group, accessible in index position three.

Despite advances in data capacity, still further increases are desired, such as would be possible with a 12.7 mm wide tape having 64 or even 128 tracks. However, even when a head is indexed, there is a practical limit to the ability of a multi-track head to accurately and reliably record data to and read data from a tape having such a large number of very narrow tracks. Problems can be caused by track mis-registrations, such as tape edge variations, environmental thermal expansion and contraction and inaccuracies in the path the tape follows in a drive. Problems may similarly be caused by inaccuracies in the formatting of tracks on the tape itself. Even a minute "wobble" in the tape can result in significant signal degradation, such as crosstalk or dropout, since a 12.7 mm tape with 128 tracks corresponds to a track width of about eighty microns.

Using fixed heads, as in the past, made it easier to deal with track mis-registrations, etc. Now, however, not only are the tracks narrower, but the head is servo-controlled. In servo-controlled tape systems, precise alignment of the tape head is maintained by using servo elements of the tape head to closely follow servo tracks stored on the tape media. In tape servo arrangements, the head must not only appear fixed in terms of a home position, but it must provide excellent accuracy while servoing across track groups. Hence, very accurate head-to-tape path adjustments are required. These adjustments include track registration, penetration, yaw, and azimuth. The servo-controlled head must not only be isolated from external shock and vibrations which could cause resonances, and hence track mis-registration, but also must be immune to resonances caused by its own servo-induced motion.

As mentioned above, advanced tape head designs separate the write element from the read element to allow an immediate read check of the data written to a data track on the magnetic tape. The servo element also follows the write element when detecting minor adjustments in the magnetic tape position relative to the tape head. This spatial separation between the write element and the read and servo elements can compound track mis-registration at certain frequencies of tape movement. Since the tape head processes data on the magnetic tape in both a forward and reverse direction, the spatial separation between the write element and the servo element can cause the write element to be positioned at a greater offset from the nominal track position, effectively squeezing data tracks together and increasing the chance of track mis-registration.

As discussed above, tape head registration and adjustment are important concerns in tape servo following system. In this respect, some tape servo systems generate position error signals (PESs) indicative of the tape head's position relative to the desired servo track. One example is found in the disclosure U.S. patent application Ser. No. 08/600,914, filed on Feb. 16, 1996 in the names of A. Chliwnyj and S. Wills, and assigned to IBM Corporation. The Chliwnyj Application is hereby incorporated in its entirety herein by reference. As taught in the Chliwnyj application, error messages may be generated under certain conditions to avoid reading or writing when the read position is determined to be too far off-track to permit writing. When an error occurs, reading and/or writing of data may be halted. Although this system may satisfy the needs of many applications, certain other applications may require different or additional kinds of error information. For example, the known type servo systems do not provide any means for monitoring servo performance prior to occurrence of an error, or for diagnosing an error that has occurred. Having information about servo performance prior to occurrence of an error might be useful for example in determining how certain errors arise, and thus how to avoid such errors.

SUMMARY OF THE INVENTION

Broadly, the present invention concerns an improved servo system for controlling tape head portion relative to magnetic tape, and for detecting, monitoring, and analyzing servo errors occurring in the servo system.

Servo elements contained within a tape head detect a lateral displacement of the magnetic tape relative to the tape head and generate position error signals corresponding to such lateral displacement. To aid in servo monitoring, the position error signals are sampled at predetermined times and the samples stored in a first machine-readable record. Each sample is classified as bad if it exceeds a predetermined threshold. Based on this record, analysis may be conducted to determine the distribution of successive bad position error signals. Further analysis may be conducted to determine the ratio between bad position error signals samples and total samples.

The foregoing data may be used for a number of different purposes. Broadly, this information is useful for monitoring servo performance to identify potential servo problems before an error occurs, thus effectively predicting performance problems. In one embodiment, this information may be used to determine the source of errors in the servo system, e.g. poorly defined top and/or bottom servo edges, malfunctions of the servo elements, problems with the servo processing circuitry, etc. Such data may also be used to help recognize large "dropouts" or "fades" in the tape media. Furthermore, this data may also be analyzed to yield an overall indication of the media surface and edge quality of the media. Importantly, this information may be employed to pinpoint servo read errors, distinguishing between media problems and servo element malfunctions. Data generated in accordance with the invention may also be used to evaluate tape media, with one possible implementation screening and subsequently binning the media according to a quality ranking.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein:

FIGS. 8A–8D illustrate a four position servo system for selecting one of four groups of tracks to be accessed in the magnetic tape format shown in FIG. 5.

FIG. 13 is a tabular depiction of exemplary bad/good sample comparison data in accordance with the invention.

DETAILED DESCRIPTION OF THE PREFERRED EMBODIMENTS

Figure 1:
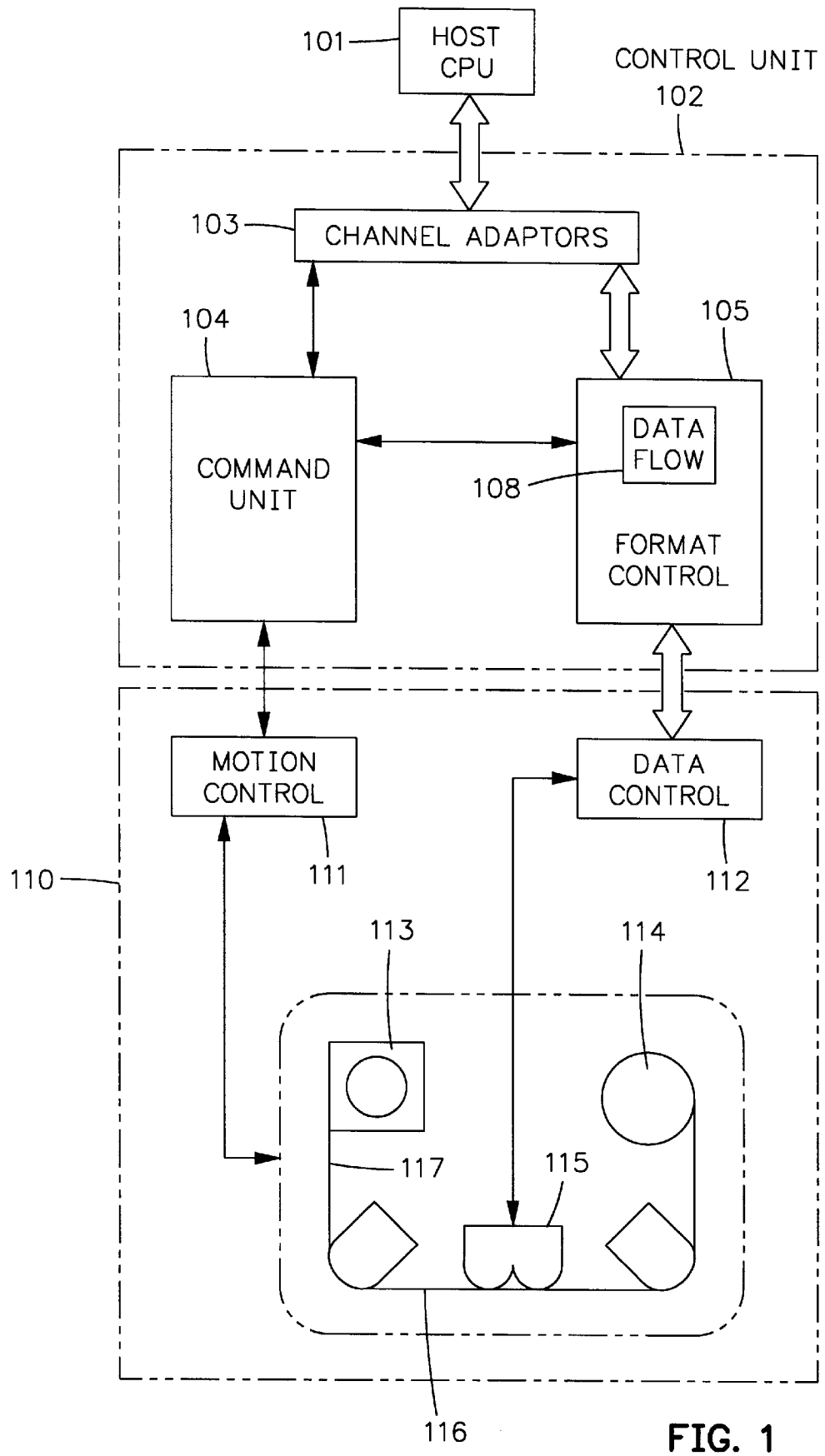
FIG. 1 is a schematic block diagram of a tape system embodying the invention.

Hardware Components & Interconnections
Data Processing System

Referring to the drawings, the invention will be described as embodied in a magnetic tape drive for use in a data processing environment. Broadly, the invention concerns a servo system for controlling the position of a tape head relative to a magnetic tape, and for detecting, monitoring, and analyzing servo errors occurring in the servo system.

FIG. 1 illustrates a data processing system, controlled by at least one host central processing unit (CPU) 101, such as an IBM System/370 or IBM Enterprise Systems/9000 (ES/9000), to store, retrieve, and manipulate data. The data processing system includes one or more storage subsystems, including at least one tape system. The tape system further includes at least one control unit 102 and at least one magnetic tape recording or playback device 110. The control unit 102 accepts commands and data from the CPU 101 via one or more channel adapters 103, and controls the device 110 accordingly. The control unit 102 and the device 110 may be physically separate or packaged together. Still further, the channel adapters 103 may be replaced by the well known small computer standard interface (SCSI). The device 110 may be an IBM tape drive (for example, an IBM 3590 tape drive) which uses a predefined data format.

The device 110 includes a motion control 111 for controlling the handling of magnetic tape media, a data control 112 including read and write circuits to operate a magnetic transducing head 115 ("tape head 115"), and a tape path 116 (including a tape cartridge 113 having tape take-up/supply reels 114 therein) for transporting a magnetic tape 117 past the head 115 for writing data to and reading data from the magnetic tape 117. The data control 112 is connected to a format control 105 in the control unit 102, which is in turn connected to the channel adapters 103. Format control 105 further includes a data flow 106 which, among other things, detects End of Block (EOB) marks located on the magnetic tape 117.

The motion control 111 is connected to a command unit 104 in the control unit 102, which command unit 104 is also connected to the channel adapters 103. The command unit 104 accepts commands from the CPU 101 via the channel adapters 103 and controls the mechanical operation of the device 110. The command unit 104 further controls the flow of data between the channel adapters 103 and the magnetic tape 117 via format control 105 and the data control 112.

Magnetic Tape Drive

Figure 2:
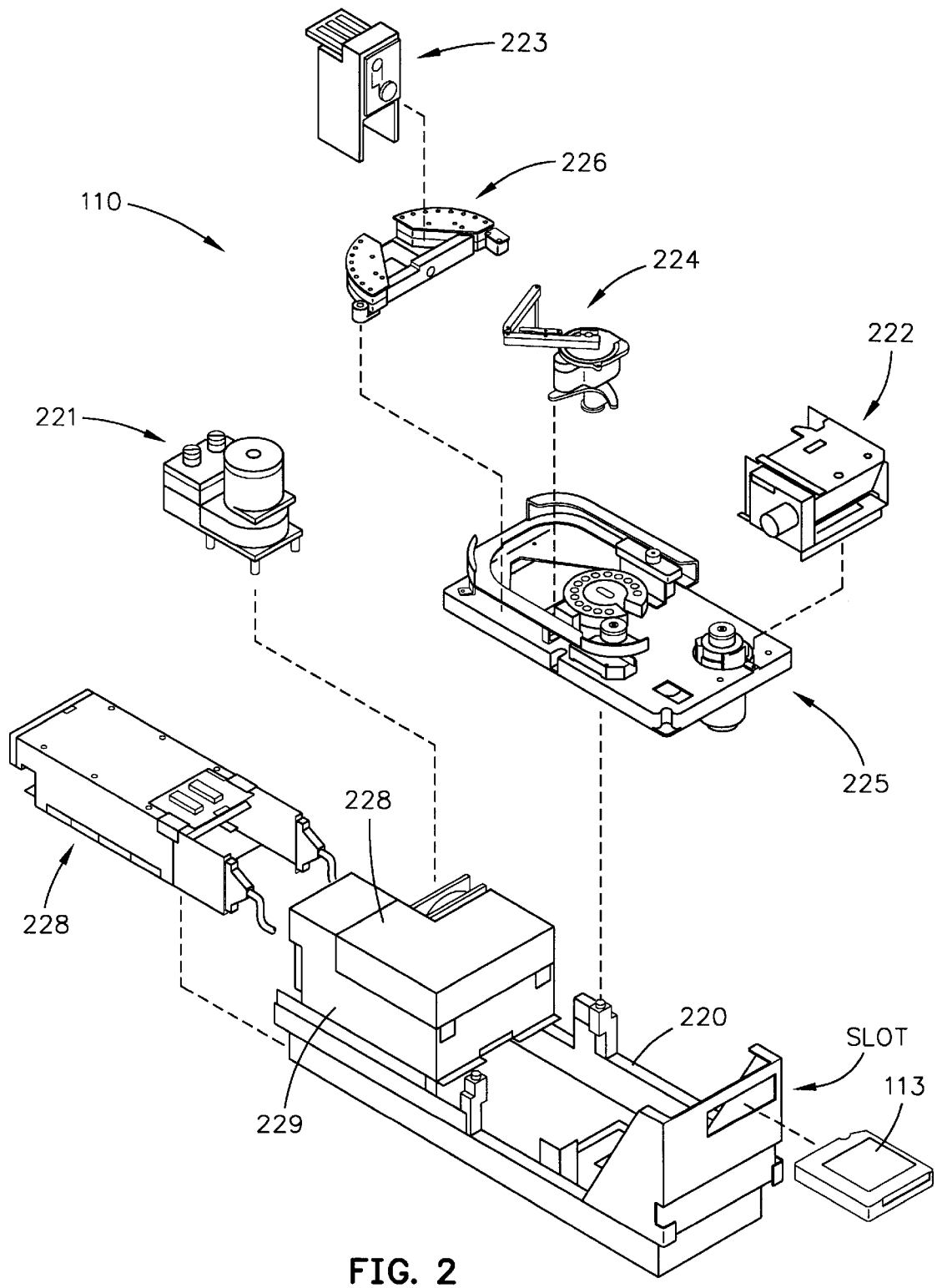
FIG. 2 is an exploded view of a magnetic tape drive according to a preferred embodiment of the present invention.

FIG. 2 illustrates an exploded view of an exemplary magnetic tape drive (device 110) in which the present invention may be incorporated. The device 110 includes a base unit 220 to which are mounted a power supply 229, various electronic circuit cards 228 (such as motion control 111 and data control 112), a deck assembly 225 and a pneumatic assembly 221. Mounted to the deck assembly 225 are a loader mechanism 222, drive motors (not specifically indicated), a pantocam assembly 224, and a head guide assembly 226. A head actuator assembly 223 is mounted to the head guide assembly 226. The device 110 can operate in stand alone and automated tape loader environments interconnected with a host computer and can also be incorporated into a multi-drive automated data storage and retrieval system (library). In operation, a removable tape cartridge 113 having a supply reel wound with magnetic tape 117 is inserted through a slot in a front face of the base unit 220 and into the loader assembly 222. The loader assembly 222 draws the tape cartridge 113 in and lowers the tape cartridge 113 onto the deck assembly 225. The pantocam assembly 224 engages a leader block attached to a free end of the magnetic tape 117 and pulls the magnetic tape around the head guide assembly 226 such that the magnetic tape 117 lays in the tape path 116 (FIG. 1) and across the magnetic tape head 115 mounted to the head actuator assembly 223. The leader block is then engaged by the take-up reel 114 (FIG. 1 on the deck assembly 225 and the device 110 is then ready to record information to or read information from the magnetic tape 117. While the device 110 illustrated in FIG. 2 includes a take-up reel and accepts tape cartridges containing only the supply reel, the present invention is not limited to use with such a drive/cartridge combination but could also be incorporated in other drive/cartridge combinations, such as those in which the tape cartridge contains both supply and take-up reels.

Head Actuator Assembly

Figure 3:
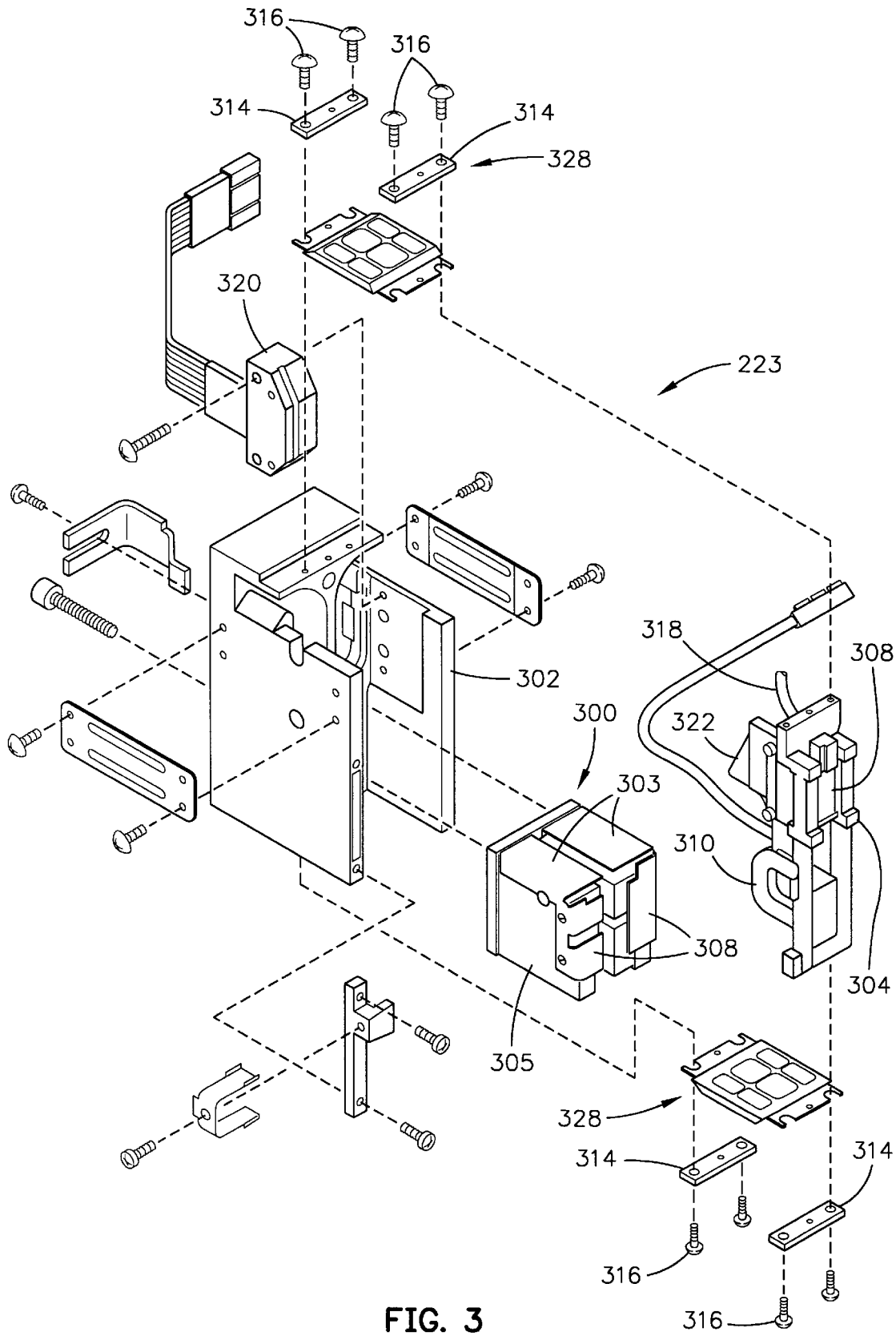
FIG. 3 is an exploded view of the elements of the head actuator assembly according to a preferred embodiment of the present invention.

FIG. 3 is an exploded view of elements making up the head actuator assembly 223. The head actuator assembly 223 includes a base member 302, a beam member 304, and a magnetic assembly 300 made up of a plurality of permanent magnets mounted to the base member 302. The electromagnetic assembly 300 includes a keeper 305 and one or more magnets 303. Fastened to the beam member 304, but located between the magnets 303 within a magnetic field produced thereby, is a substantially flat electrical coil 310 (as opposed to a cylindrical voice coil coaxial with a yoke). Mounted to an outer surface of the beam 304 is a multi-track magneto-resistive (MR) transducer 308 (hereinafter referred to as head 308). Interconnecting upper and lower ends of the beam 304 with upper and lower portions of the base member 302 are parallel upper and lower flexures 326 and 328, respectively, secured with brackets 314 and screws 316 (although alternative mounting methods can also be used). The beam member 304 is thus suspended away from the base member 302.

A hose 318 is secured to the beam member 304 to provide air to outlets in the head 308 as a "puffer" device to lift the magnetic tape away from the head 308, thus preventing the magnetic tape 117 from sticking to the head 308 during fast forward and rewind operations. Also preferably incorporated into the actuator assembly 223 is an optical tachometer to provide beam position feedback to the control unit 102 (FIG. 1) during head 308 indexing. The optical tachometer includes an optical sensor 320 mounted to the base member 302 and an associated indexing strip 322 positioned through a slot in the optical sensor 320 and which is mounted to, and moves with, the beam member 304.

Head Guide Assembly

Figure 4:
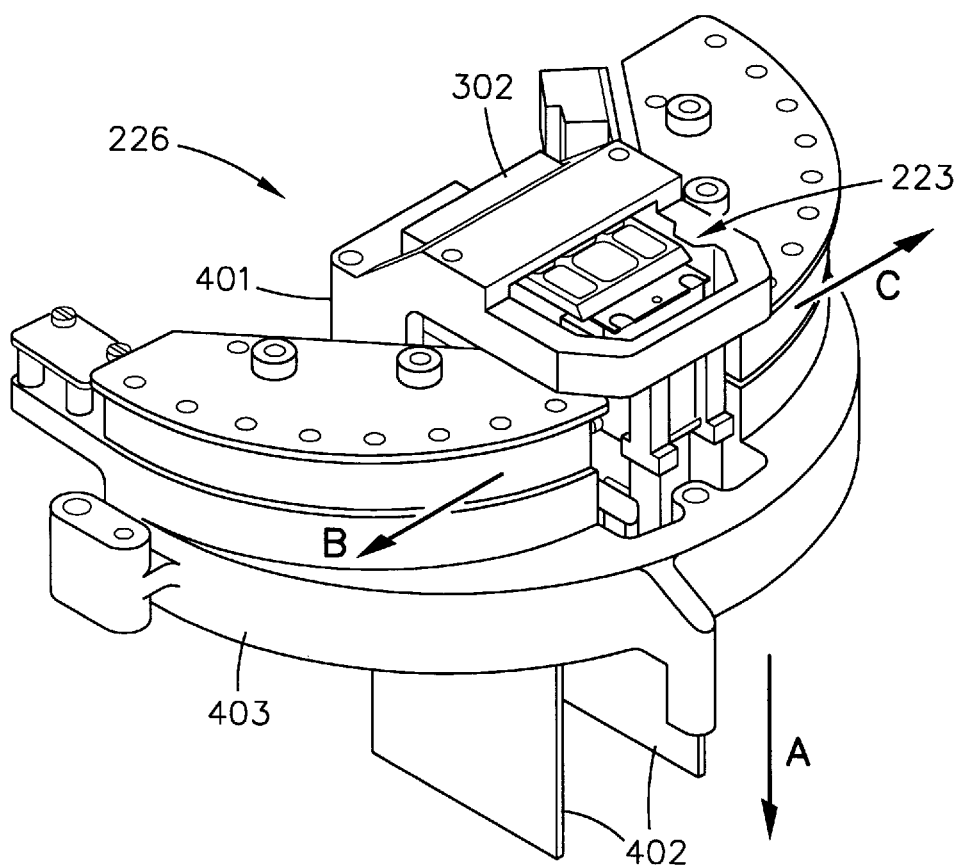
FIG. 4 is a perspective view of a head guide assembly having the head actuator assembly mounted therein according to a preferred embodiment of the present invention.

FIG. 4 depicts the head guide assembly 226 with the actuator assembly 223 secured to the base member 302, the base member 302 further coupled to a head guide support 403. Various brackets and screws secure the elements of the actuator assembly 223 together and various cables (including ribbon cables 402 for the head 308) interconnect the head 308, the coil 310 and the optical sensor 320 with the circuit cards 228 of the device 110. To reduce mechanical interference by the ribbon cables 402 with proper motion of the beam member 304, the ribbon cables 402 are preferably guided upwards along the sides of the beam member 304 and outwardly from the base member 302 by winged surfaces 322 inside the beam member 304 (FIG. 3).

In operation, when it is desired to access a particular set of tracks on the magnetic tape 117, the motion control 111 (FIG. 1) supplies a current to the coil 310. An electromagnetic field induced by the coil 310 interacts with the magnetic field of the magnets 303 to generate a force opposing a bias of the flexures 326 and 327 tending to maintain the beam member 304 in a primary position. The force urges the beam member 304, to which the coil 310 is secured, to move transversely along an axis A—A (FIG. 4) relative to the tape path (indicated by an axis B—B). When the actuator 223 is in a seek or index mode, a magnitude of the current supplied to the coil 310 will be relatively large to produce a relatively large beam member 304 displacement across one to three tracks, thus holding appropriate transducer elements opposite desired tracks. When the actuator 223 is in a track following mode, the servo loop, responding to position error signals from servo tracking elements in the head 308, makes very small, high frequency adjustments to the coil current to maintain precise transducer/track alignment.

Track Format

Figure 5:
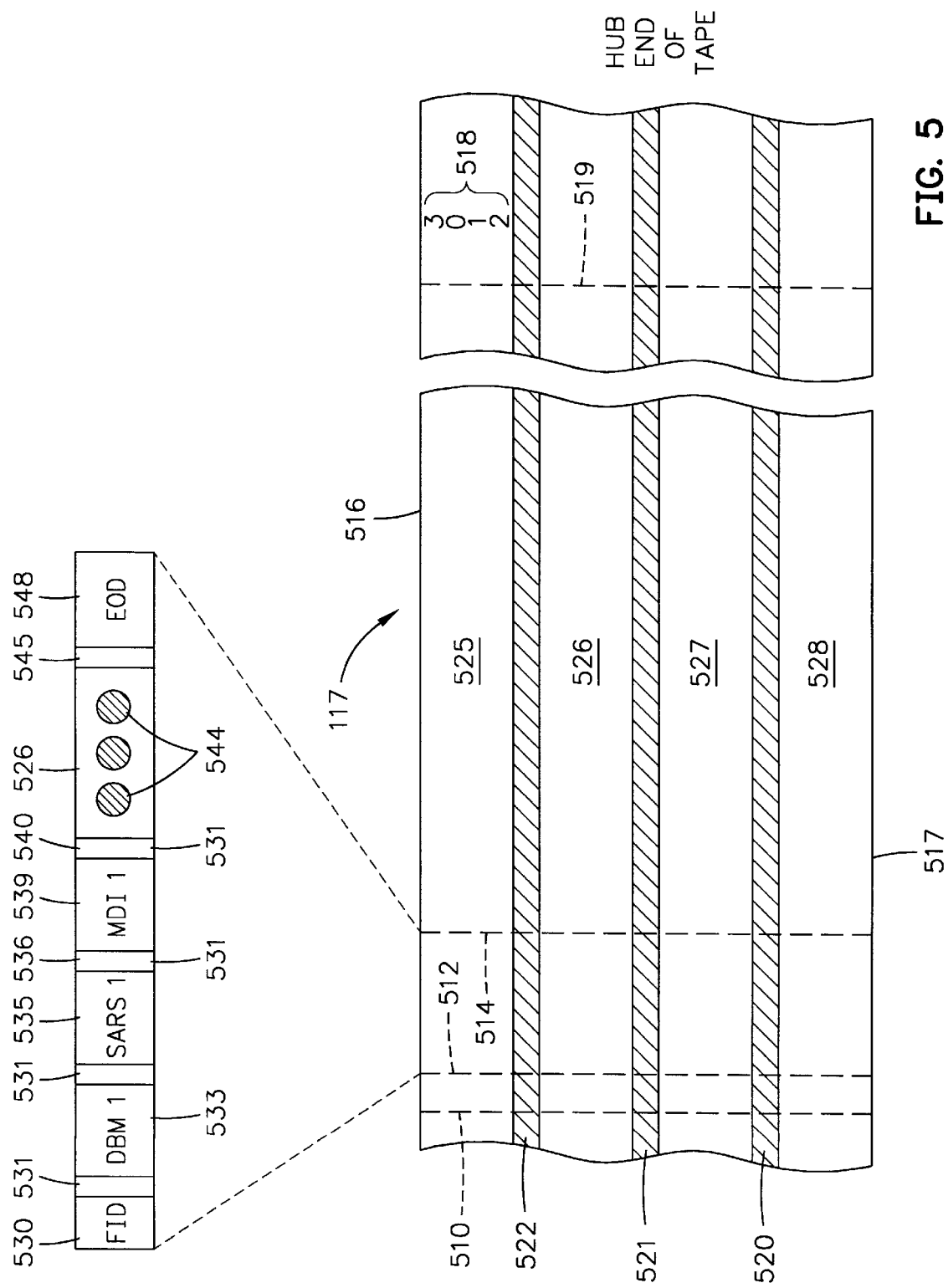
FIG. 5 is a diagram of a magnetic tape format used by the present invention.

Referring now to FIG. 5, a diagram shows the track format for the magnetic tape used in the tape system depicted in FIG. 1. The magnetic tape 117 contains three longitudinally extending servo areas 520–522 which are laterally spaced across the tape surface between its longitudinal edges 516, 517. The three servo areas 520–522 laterally partition the magnetic tape 117 into four data track areas 525–528. A calibration area is provided between dashed lines 510 and 512 at the free end of the magnetic tape, denoted by dashed line 510. This calibration area 510–512 contains signals that enable the tape drive 110 to calibrate its operation to the specific characteristics of the loaded magnetic tape 117. Data can be recorded on the remainder of the magnetic tape 117, indicated by the area between dashed lines 512 and 519. Data is serially recorded on the magnetic tape 117 in one of four track groups 518, labelled 0–3 and laterally interleaved across each of the four data track areas 525–528.

Since track group 0 518 is the logical beginning of the data recording on the magnetic tape 117, tape control information useful to the control unit 102 or the tape drive 110 may be recorded therein. Such tape control information includes data base map (DBM) 533, statistical analysis recording system (SARS) 535, and mount-demount indicator (MDI) 539. A drive partition 512–514 exists on track group 0 to record the aforementioned tape control information. This drive partition 512–514 is only addressable by the tape drive 110 and not the control unit 102. This drive partition 512–514 is accessed by moving the magnetic tape 117 to its load point (FID) 530. All other partitions on the magnetic tape 117 are addressable by the control unit 102 and sequentially numbered beginning with 0 near the free end of the tape 510. However, the drive partition 512–514 is not numbered. Each partition, whether a drive partition or an addressable partition, is a logical collection of contiguous sectors. Each partition may contain a different number of sectors. A sector is a length of magnetic tape 117 measured by a tachometer, typically located within the hub 14 of the magnetic tape 117. A specific sector can be accessed by moving the magnetic tape 117 and monitoring the count values generated by the tachometer (not shown).

The tape drive 110 may supply the control information stored in the drive partition 512–514 of the magnetic tape 117 to the control unit 120 if desired. This control information consists of information that is primarily useful to the tape drive 110 as it typically identifies physical locations on the magnetic tape 117 of control data elements which are used for locating where certain data is located on the magnetic tape 117. For example, these locations on magnetic tape, or data elements, may be referenced as partitions, logical volumes, files, or the like. The drive partition 512–514 may include a plurality of information partitions 544, each containing a block of DBM, SARS, and MDI data. Each block of data within the information partition is separated by an inter-block gap (IBG) 531. An end of data (EOD) 548 control block indicates the end of the drive partition 512–514. Again, the tape drive 110, and not the control unit 120, can access the aforementioned control information in the drive partition 512–514. The tape drive 110 typically provides the control information to the control unit 120 by storing such control information temporarily in a memory (RAM).

Figure 6:
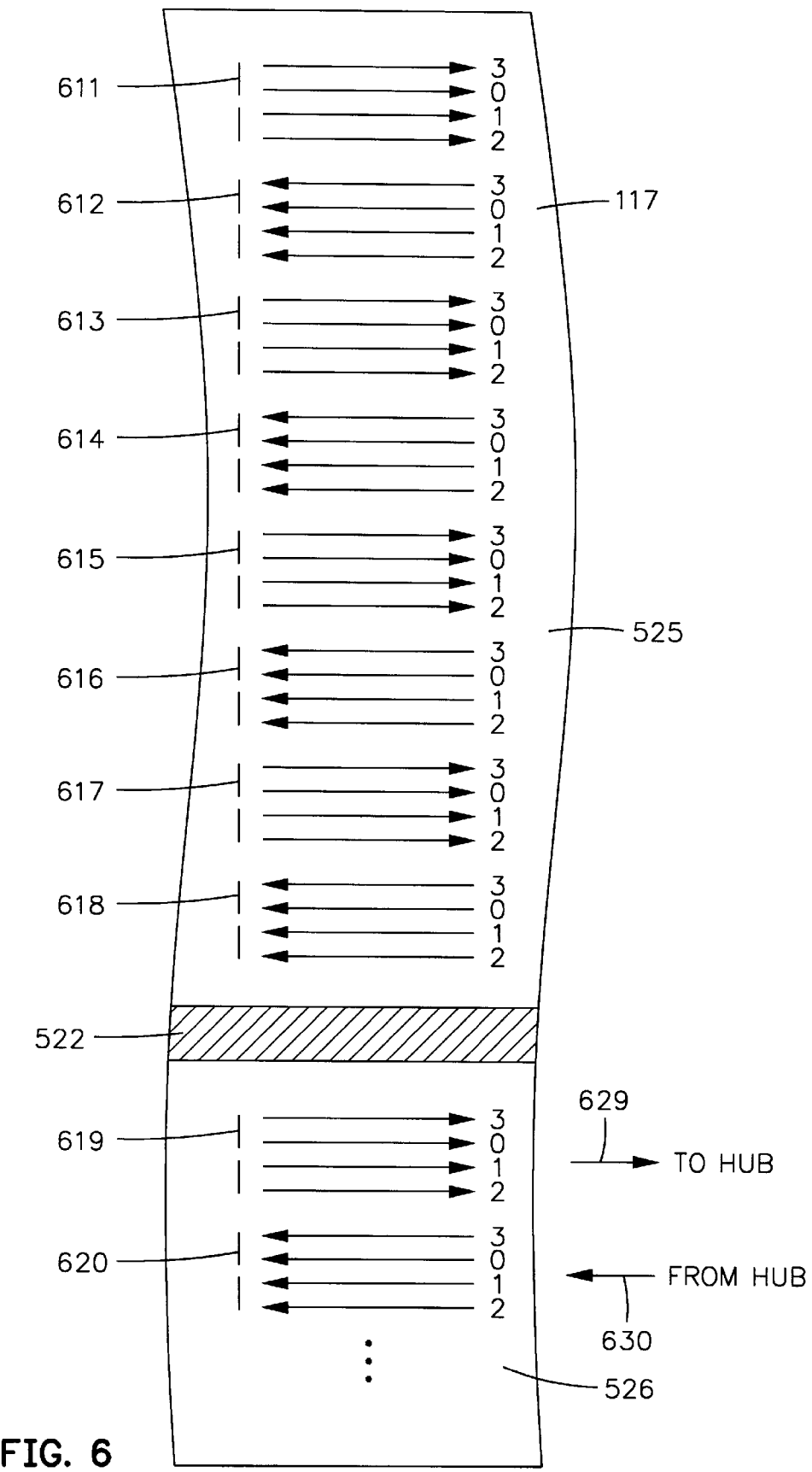
FIG. 6 is a diagram of a serpentine track accessing for the magnetic tape format illustrated in FIG. 5.

FIG. 6 illustrates a spacing of tracks across a lateral, cross-section of magnetic tape 117. Data track areas 525–526 are separated by servo area 522. The physical tracks are grouped in track clusters 611–620. Each track cluster 611–620 consists of one track from each of the four track groups 518, 0–3. Adjacent track clusters 611, 612 are scanned in opposite directions 629, 630. In this specific diagram for example, odd numbered track clusters 611, 613, 615, 617, 619 are scanned in a direction 629 toward the magnetic tape hub 114 while even numbered track clusters 612, 614, 616, 618, 620 are scanned in a direction 630 away from the hub 114. The "to hub" direction 629 results from reeling magnetic tape 117 from the tape cartridge 113 spool and the "from hub" direction 630 is caused by reeling magnetic tape 117 onto the tape cartridge 113 spool. Thus, the magnetic tape 117 is scanned in a serpentine manner.

Head/Tape Relationship

Figure 7:
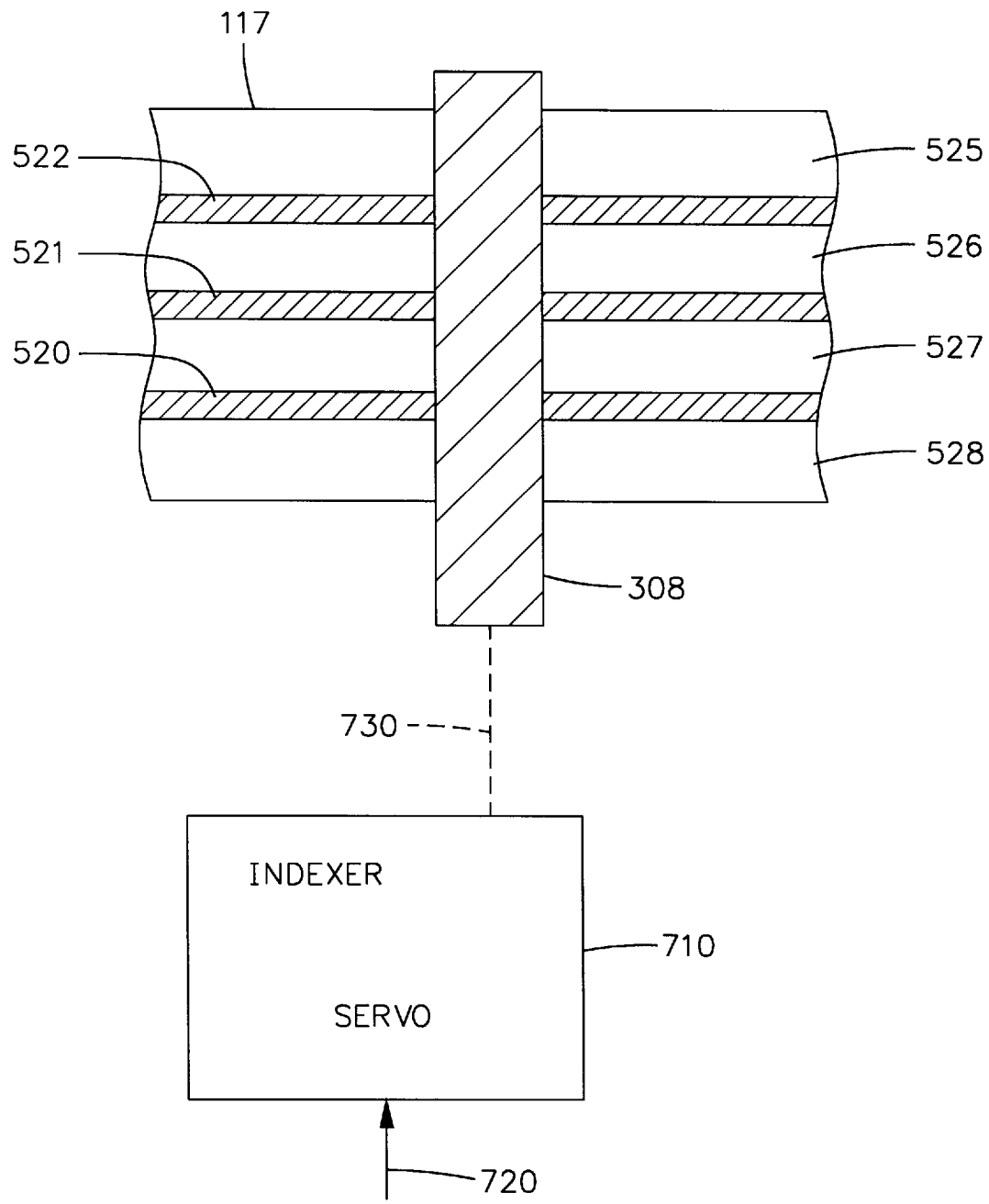
FIG. 7 is a simplified block diagram depicting a head indexing and servoing system for the tape system illustrated in FIG. 1 using the magnetic tape format shown in FIG. 5.

Referring to FIG. 7, a block diagram shows a magnetic head 308 relative to magnetic tape 117 passing beneath it. The magnetic head 308 has three sets of servo gaps that concurrently sense the three servo tracks 520–522 along the magnetic tape 117, resulting in three positional error signals (PES). These three positional error signals combine to form a servo drive signal 720 to the servo 710. The servo 710 moves the head 308 according to the servo drive signal 720 allowing the head 308 to correctly align itself laterally across the magnetic tape 117 and accurately access information stored in tracks longitudinally extending along the data track areas 525–528 of the magnetic tape 117. Dashed line 730 represents the servo 710 aligning the head 308.

FIGS. 8A–8D demonstrate how the read-write head element pairs 810, 812 within the tape head 308 laterally traverse a cross-section of magnetic tape 117 to access the distinct track groups 518 in the data track area 525. In addition, servo element pairs 814–815 and 816–817 follow along either of two servo edges 820, 822 within a servo track area 522 keeping the tape head 308 aligned with the magnetic tape 117. The servo elements 814–817 may be individually reffered to as "S1", "S2", "S3", and "S4".

As previously stated, the magnetic tape 117 travels longitudinally across the tape head 308. The servo edges 820, 822 allow the tape head 308, and the associated read-write 810, 812 and servo 814–815, 816–817 element pairs, to adjust laterally to the magnetic tape 117 as it travels past the head 308.

As shown in FIG. 8A (and likewise applicable to FIGS. 8B–8D although not shown therein), each servo track area (such as 522) may comprise first, second, and third regions 850–852. The first and third regions 850, 852 may each contain a first amplitude servo pattern, called "F1". The second region 851 may contain a different amplitude servo pattern (such as amplitude "bursts"), called "F2". Boundaries between F1 and F2 type regions define the servo edges 820, 822. The servo edge 820 defines an "upper edge" and the servo track 822 defines a lower edge. In FIG. 8A, the servo element pair 816 is following the upper edge 820 of the servo track area 522.

In FIG. 8A, the tape head 308 is accessing track group 3. Read-write element pair 810 accesses information along track group 3 when the magnetic tape 117 travels in the "to hub" direction 629 while the alternate read-write element pair 812 accesses data from the same track group when the magnetic tape 117 moves in the opposite direction 630. The servo element pair 816 situated farthest from the read-write element pairs 810, 812 aligns tape head 308 to the passing magnetic tape 117 by sensing the upper servo track 820 positioned within the servo track area 522. When the magnetic tape 117 laterally deviates from the tape head 308, the servo element pair 814, 816 senses such deviation and generates a position error signal. This position error signal is combined with two additional position error signals corresponding to the two other servo areas (521 and 520) of the magnetic tape 117. A servo drive signal 720 is then generated from these combined position error signals to laterally adjust the tape head 308 to the passing magnetic tape 117.

Correspondingly, the tape head 308 can access information from tracks in track groups 0–2 as shown in FIGS. 8B–8D. In FIG. 8B, the read-write element pairs 810, 812 access information along track group 0 according to which direction 629, 630 the magnetic tape 117 travels past the tape head 308. The servo element pair 816 situated farthest from the read-write element pairs 810, 812 aligns tape head 308 to the passing magnetic tape 117 by sensing the lower servo track 822 (i.e., the lower edge). In FIG. 8C, read-write element pairs 810, 812 can access information along track group 1 depending on which direction 629, 630 the magnetic tape 117 travels past the tape head 308. The servo element pair 814 situated closest to the read-write element pairs 810, 812 aligns tape head 308 to the passing magnetic tape 117 by sensing the upper servo track 820 (i.e., upper edge). Finally, FIG. 8D shows that read-write element pairs 810, 812 access track group 2 while the servo element pair 814 situated closest to the read-write element pairs 810, 812 aligns tape head 308 to the passing magnetic tape 17 by sensing the lower servo track 822 (i.e., lower edge).

Servo System

A. General

Figure 9A:
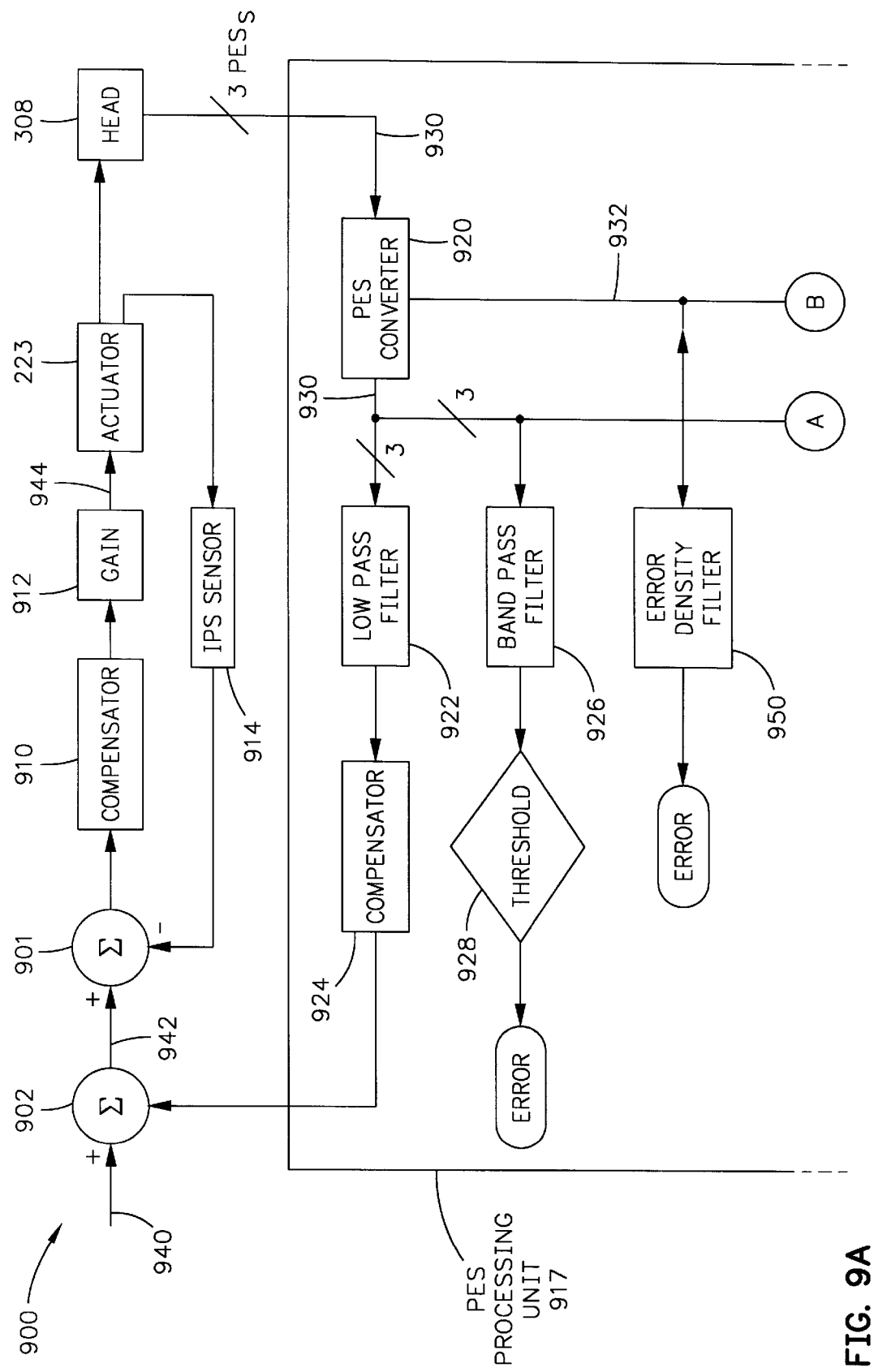
FIGS. 9A–9B are a block diagram of the servo system of the present invention used for aligning a tape head along a magnetic tape.
Figure 9B:
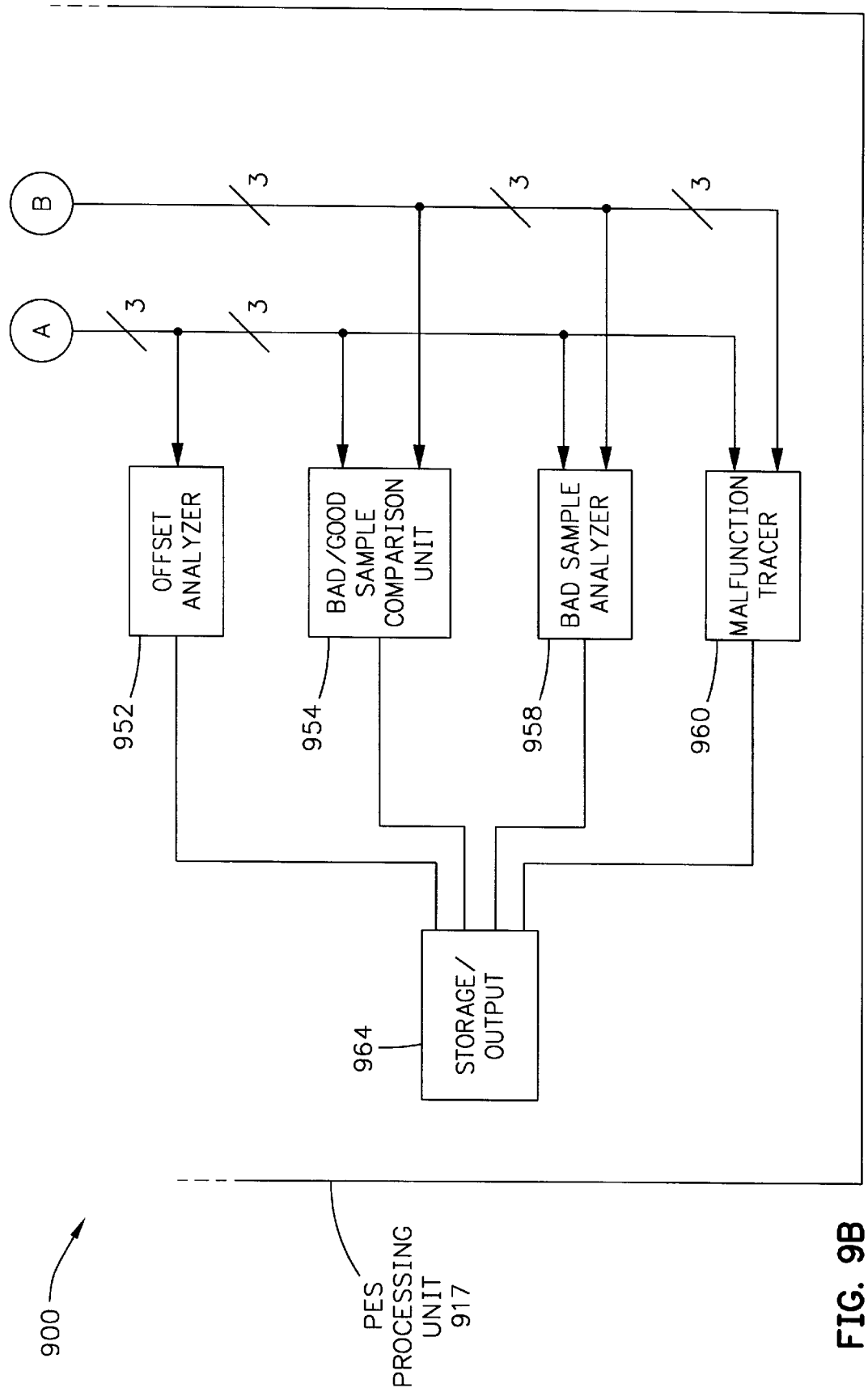

FIGS. 9A–9B are shows a block diagram of the servo system 900 embodied in the present invention. As stated earlier, the servo system 900 laterally adjusts the tape head 308 to a passing magnetic tape 117 such that the read-write element pairs 810, 812 can access information stored longitudinally in tracks on the magnetic tape 117. Preferably, the servo system 900 is implemented in the motion control 111 of the tape drive depicted in FIG. 1.

As depicted in FIGS. 9A and B, the servo system 900 contains inner 901 and an outer 902 feedback loops. The inner feedback loop 901 positions the tape head 308 relative to the frame, or casing, of the tape drive 110. Correspondingly, the outer feedback loop 902 aligns the tape head 308 with respect to the passing magnetic tape 117, using minor lateral movements.

B. Inner Feedback Loop

The inner feedback loop 901 includes an inner compensator 910, a gain circuit 912, the actuator 223 to the tape head 308, and an independent position sensor (IPS) 914. Typically, the IPS 914 is an optical sensor which detects movements of the tape head 308 relative to the frame of the tape drive 110. The inner compensator 910 and gain circuit 912 simply alter the phase and the gain of the signal into the actuator 223 and are well-known in the art. As described earlier, the actuator 223 produces the signals to physically position the tape head 308. In operation, the IPS 914 detects when the tape head 308 needs to be adjusted relative to the frame of the tape drive 110. The IPS 914 sends a feedback signal component to the requested head position signal 942 to adjust the tape head 308 relative to the frame of the tape drive 110. The inner compensator 910 and gain circuit 912 adjust the phase and strength of the combined tape position signal 944 to be received as input to the actuator 223. The actuator 223 then controls and or adjusts the position of the tape head 308.

C. Outer Feedback Loop

The outer feedback loop 902 includes the inner compensator circuit 910, gain circuit 912, and the actuator 223 of the inner feedback loop 901 in its forward path. The signal 940 comprises a requested initial track position signal, which may be provided by circuitry of the motion control 111 in accordance with known techniques. In addition, the outer feedback loop 902 contains the three position error signals (PES) generated from the servo track areas 520–522 and a PES processing unit 917. The PES processing unit 917 may be implemented, for example, using a Texas Instruments model TMS 320C50 digital signal processor, or another suitable logic or processing unit. The outer feedback loop 902 also has a PES converter 920, a low-pass filter 922, and an outer compensator 924 in its feedback path.

As stated earlier, three servo element pairs within the tape head 308 follow three servo track areas 520–522 longitudinally placed upon the magnetic tape 117 and generate three position error signals 930 corresponding to any needed lateral adjustments of the tape head 308 to the passing magnetic tape 117. The PES converter 920 checks the "veracity" of each of the three generated position error signals 930. This involves checking the three signals to ensure that the current amplitude difference ("delta") from the previous signal sample does not exceed a certain limit. This results in position reliability signals 932.

Stated differently, the PES converter, for each sample of each of the PES 930, determines whether that sample meets certain predetermined criteria. In one exemplary embodiment, this criteria may involve comparing each PES sample to a predetermined threshold, such as ±8 microns for example. In this embodiment, then, each time the sample evaluator 962 receives a PES sample indicating that a servo element is more than 8 microns off track, that sample is deemed "bad." As discussed in greater detail, "bad" samples are used for a number of different purposes, such as diagnosing head, servo system, and media malfunctions.

The position error signals 930 consist of three components: a low (less than 100 Hz), midrange (between 100 Hz and 450 Hz), and high (greater than 450 Hz) frequency component. The low frequency portion of the position error signal 930 results from lateral movement of the magnetic tape 117 during normal operation. The midrange frequency component typically results from tape edge vibration and distortion from the magnetic tape 117. Finally, the high frequency components consists solely of noise and carries no useful information regarding the lateral positioning of the tape head 308 to the magnetic tape 117. Thus, the high frequency and midrange frequency components should ideally be removed from the position error signal 930 when feeding it back to the initial desired tape position signal 940.

1. Low Pass Filter

The three position error signals 930 are filtered using a low-pass filter 922 removing both the high frequency, noisy signal content, and the midrange frequency content. The three signals 930 are sampled individually, summed together, and averaged in the filter 922 to obtain a single low frequency output which corresponds to the lateral position adjustment of the tape head 308 relative to the magnetic tape 117. This filtering is distinguished from normal low-pass filtering preferred in the art, where each signal is low-passed filtered separately and the individual filtered signals are then combined to form the overall filtered signal. The filter 922 of the present invention gives more weight to a group of position error signals 930 that resemble each other in phase and amplitude than a group of signals having no resemblance. Whereas, the filtering techniques in current art do not provide this result. Finally, the output signal from the low-pass filter 922 is adjusted for phase and gain through the compensator 924 and combined with the initial desired position signal 940 at the end of the feedback path of the outer loop 902.

2. Band-pass Filter

Another component of the PES processing unit 917 is a band-pass filter 926 and a threshold detector 928 which provide one form of error detection within the servo system 900. As stated earlier, position error signal 930 components within the midrange frequencies (100 Hz to 450 Hz) are often attributed to distortion and tape edge vibration of the magnetic tape 117. Whereas these signal components are not used to laterally align the tape head 308 to the magnetic tape 117, the midrange frequency components are used in the present invention to detect tape distortion and tape edge vibration type errors. The three position error signals 930 are filtered through the band-pass filter 926 resulting in a single error signal. The output from the band-pass filter 926 is then compared to a specified threshold 928. If the output exceeds the threshold 928, an error of this type is flagged.

3. Error Density Filter

The PES processing unit 917 also includes an error density filter 950, which provides detection of a second type of errors, such as surface defects along the magnetic tape 117. The position reliability signals 932 generated in the PES converter 920 are processed through the error density filter 950. As previously stated, the PES converter 920 generates a position reliability signal 932 by checking the amplitude of the position error signal against a minimum and maximum range and differential threshold. If the amplitude exceeds the range or the threshold, a veracity error (or 1) is set in the position reliability signal 932. Otherwise, the position reliability signal is set to indicate no error (0). The position reliability signals 932 are then summed to calculate an overall error density. This error density is then compared to a specified threshold to determine if a surface error exists on the magnetic tape 117.

Figure 11:
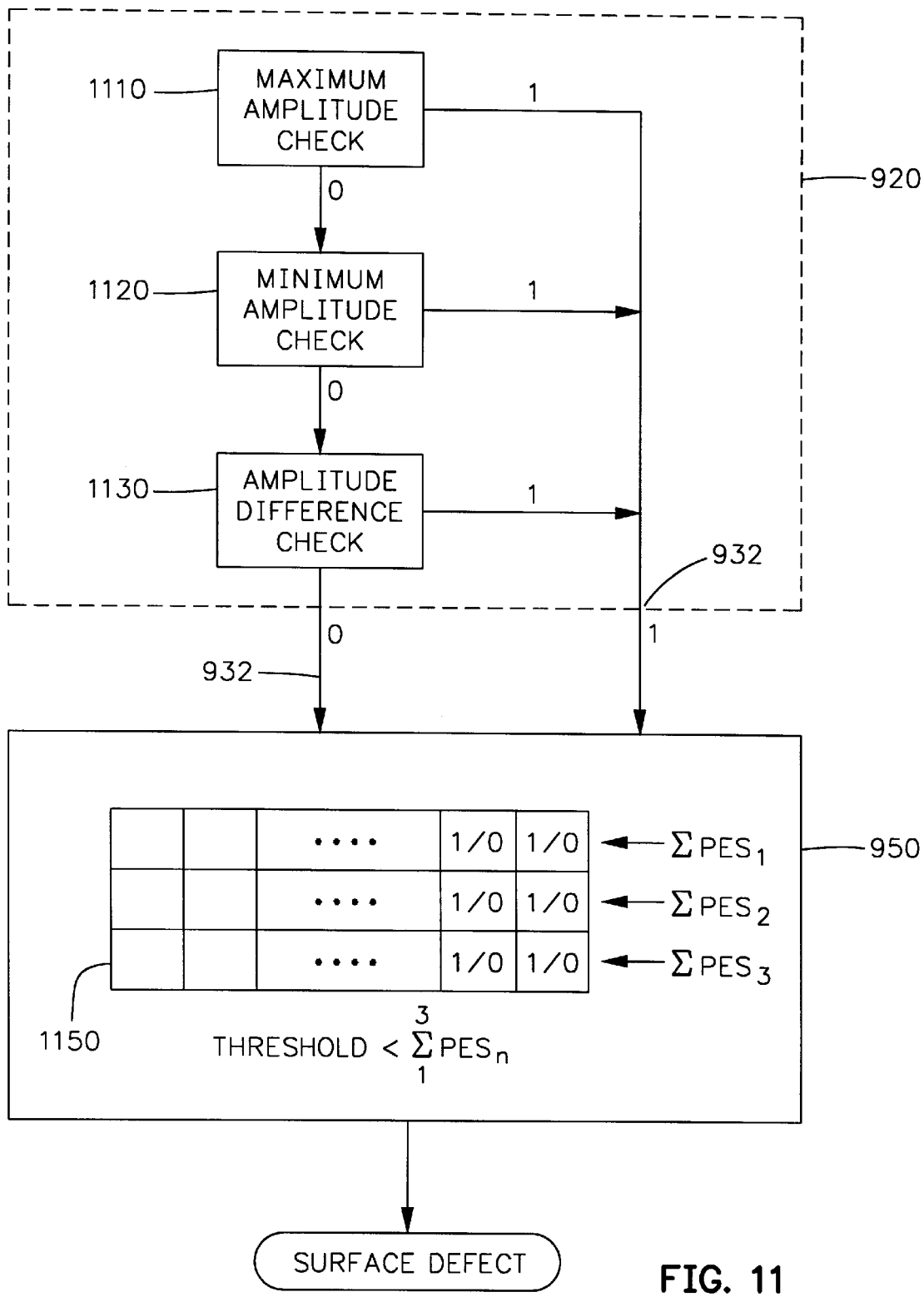
FIG. 11 shows a detailed block diagram of the error detection mechanism of the servo system of the present invention.

FIG. 11 shows a more detailed block diagram of the error density filter in the present invention. An effective servo system must detect defective areas along the surface of the magnetic tape 117 (FIG. 1), such as dropout or debris. As previously stated, three servo element pairs 814, 816 (FIG. 8) contained within the tape head 308 (FIG. 3) trace along three servo track areas 520–522 (FIG. 5) within the magnetic tape 117 surface generating three position error signals 930 (FIGS. 9A and B). As stated earlier, the PES converter 920 generates a position reliability signal 932 for each position error signal 930 (see FIG. 9). At block 1110 within the PES converter 920, the amplitude of each position error signal 930 is checked against a specified maximum amplitude. A position reliability signal 932 indicating an error (or 1) is generated only when the maximum amplitude is exceeded. Likewise, the three position error signals 930 are compared to a minimum amplitude at block 1120. If the minimum is not reached, a position reliability signal 932 indicating an error (or 1) is set. Otherwise, no error (or 0) is indicated. Comparison of position error signals to maximum and minimum amplitudes is explained further in U.S. Pat. No. 5,448,430 to Bailey et al., issued on Sep. 5, 1995, assigned to IBM Corporation, and incorporated herein by reference in its entirety.

At block 1130, a differential amplitude is calculated for each of the three position error signals 930. A position reliability signal indicating an error (1) is set when the differential amplitude exceeds a specific threshold. Otherwise, no error (or Ø) is indicated.

In the error density filter 950, the three position reliability signals 932 are stored within an array 1150. The array 1150 contains the twelve values of each position reliability signal corresponding to each servo track area 520–522. Thus, the array 1150 consists of three rows, each row having twelve columns. Each row corresponds to the sampled position reliability signals 932 for one of the servo track areas 520–522 along the magnetic tape 117. Accordingly, each column represents the position reliability signals 932 corresponding to a particular cross-section of the magnetic tape. When summing the values stored in each row of the array 1150, the condition of the magnetic tape 117 surface longitudinally extending along each servo track area 520–522 can be determined. The error density filter 950 calculates an error density value by summing the thirty-six position reliability signal 932 values stored in the array 1150. This error density value is then compared to a specified threshold to determine if the section of tape associated with these position signal values contains surface defects. In calculating the error density, a sum is first computed of the twelve position reliability signal 932 values in each row. If any row sum exceeds a particular threshold for the row, a single track failure is detected. When a single track failure occurs, the overall threshold is adjusted upward before comparing with the error density. In this way, the error density filter 950 makes an allowance for single track failures before determining whether the magnetic tape 117 contains surface errors. Thus, positional information regarding the passing magnetic tape 117 can still be used in the case where one servo track 520 provides unreliable signals but the remaining two servo areas 521, 522 provide reliable position error signals 930.

4. Offset Analyzer

The PES processing system 917 also includes an offset analyzer 952. The offset analyzer 952 receives and analyzes the PES 930 to evaluate the operation of the servo system. In the preferred embodiment, the offset analyzer 952 prepares a histogram indicating, for each PES 930, how many of each particular value of PES 930 occur in a certain span of magnetic tape. As an example, this span may comprise a "wrap half", a track, or a part of a track or wrap half. A "wrap half" is an end-to-end path in a serpentine storage pattern, where a "wrap" constitutes two wrap halves that can be accessed by different servo elements without laterally moving the tape head. For instance, a designated tape span may produce 600,000 zero micron offsets, 700,000 one micron offsets, etc.

The offset analyzer 952 may create a machine-readable record of its results, which is stored and/or output using the storage/output unit 964. As an example, the storage/output unit 964 may comprise storage such as RAM, DASD, etc., or an output device such as a serial port, parallel port, visual display, etc.

5. Bad/Good Sample Comparison Unit

Another component of the PES processing system 917 is the bad/good sample comparison unit 954. From the PES converter 920 the unit 954 receives the PES 930, and an identification of which of these samples are "bad". Using this input information, the unit 954 determines the ratio between bad and total samples in a certain span of magnetic tape. As an example, this span may comprise a "wrap half", a track, or a part of a track or wrap half.

The bad/good sample comparison unit 954 may further apply predetermined criteria to evaluate the calculated ratio. For example, the unit 954 may compare the ratio to a predetermined threshold, such as 1:200. In this example, having more than one bad sample in 200 samples triggers an alert condition.

The unit 954 may also create a machine-readable record of its results, which is stored and/or output using the storage/output unit 964.

6. Bad Sample Analyzer

Another component of the PES processing system 917 is the bad sample analyzer 958. The bad sample analyzer 958 evaluates operation of the servo system by receiving the PES 930 and analyzing the bad samples. In the preferred embodiment, the bad sample analyzer 958 analyzes lengths of consecutive bad PES samples in a given span of tape such as a wrap half, track, or a part thereof. A PES for a given span of magnetic tape may yield, for example, one group of seven consecutive bad samples, two groups of six consecutive bad samples each, four groups of three consecutive bad samples each, etc. The bad sample analyzer 958 also generates a histogram indicating how many of each string length occur in the span of tape.

The bad sample analyzer 958 may create a machine-readable record of its results, which is stored and/or output using the storage/output unit 964.

7. Malfunction Tracer

Still another component of the PES processing system 917 is the malfunction tracer 960. From the PES converter the malfunction tracer 960 receives the PES 930, as well as an identification of which of these samples are "bad". The malfunction tracer 960 evaluates the PES 930 in the given tape span to determine the source of malfunctions occurring in the servo system during that period.

The malfunction tracer 960 may create a machine-readable record of its results, which is stored and/or output using the storage/output unit 964. Such a record may comprise a table, for example, as discussed above. Operation of the malfunction tracer 960 is discussed in greater detail below.

General Operation

In addition to the various hardware embodiments described above, a different aspect of the invention concerns a method for servo sample monitoring and analyzing in a magnetic tape drive. Such a method may be implemented, for example, by operating the motion control 111 to execute a sequence of machine-readable programming instructions. These instructions may reside in various types of data storage media. In this respect, one aspect of the present invention concerns an article of manufacture, comprising a data storage medium tangibly, embodying a program of machine-readable instructions to perform servo sample monitoring and analysis in a magnetic tape drive.

This data storage device may comprise, for example, RAM (not shown) contained within the motion control 111. Alternatively, these instructions may be contained elsewhere, on a data storage medium such as a magnetic data storage diskette 1000 (FIG. 10A). Whether contained in the motion control 111 or elsewhere, the instruction may instead be stored in various other data storage media, such as a DASD storage, magnetic tape, electronic read-only memory (RAM), optical storage paper "punch cards", or other data storage media. In an illustrative embodiment of the invention, the machine-readable instructions may comprise lines of compiled "C" language code in combination with assembly language code compatible with the Texas Instruments TMS 320C50 digital signal processing chip.

Figure 10B:
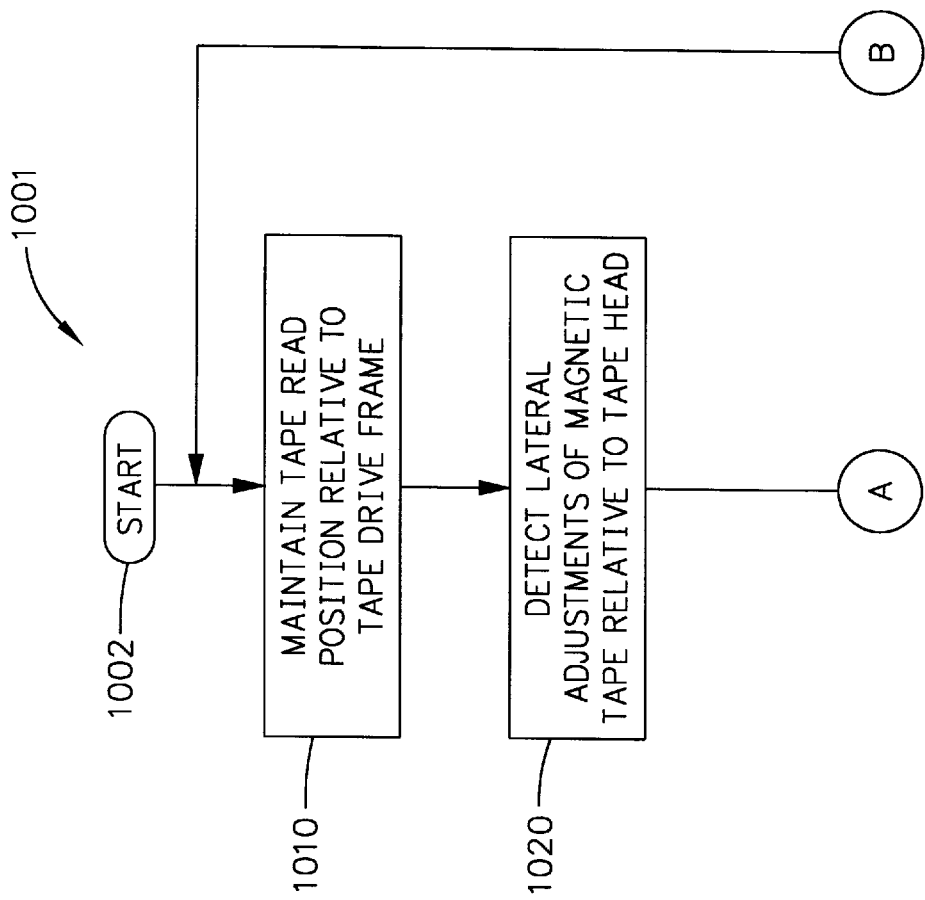
FIGS. 10B and 10C are a block diagram illustrating the servo-control method in the present invention for aligning tape head relative to magnetic tape.
Figure 10A:
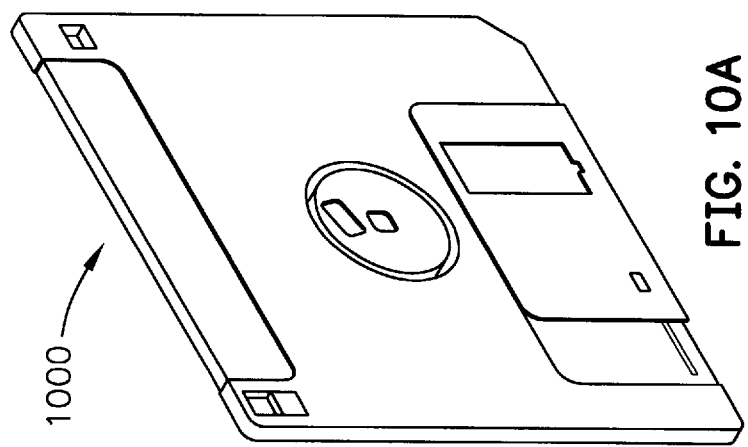
FIG. 10A is a diagram of an exemplary article of manufacture in accordance with the invention, embodied by a data storage medium.
Figure 10C:
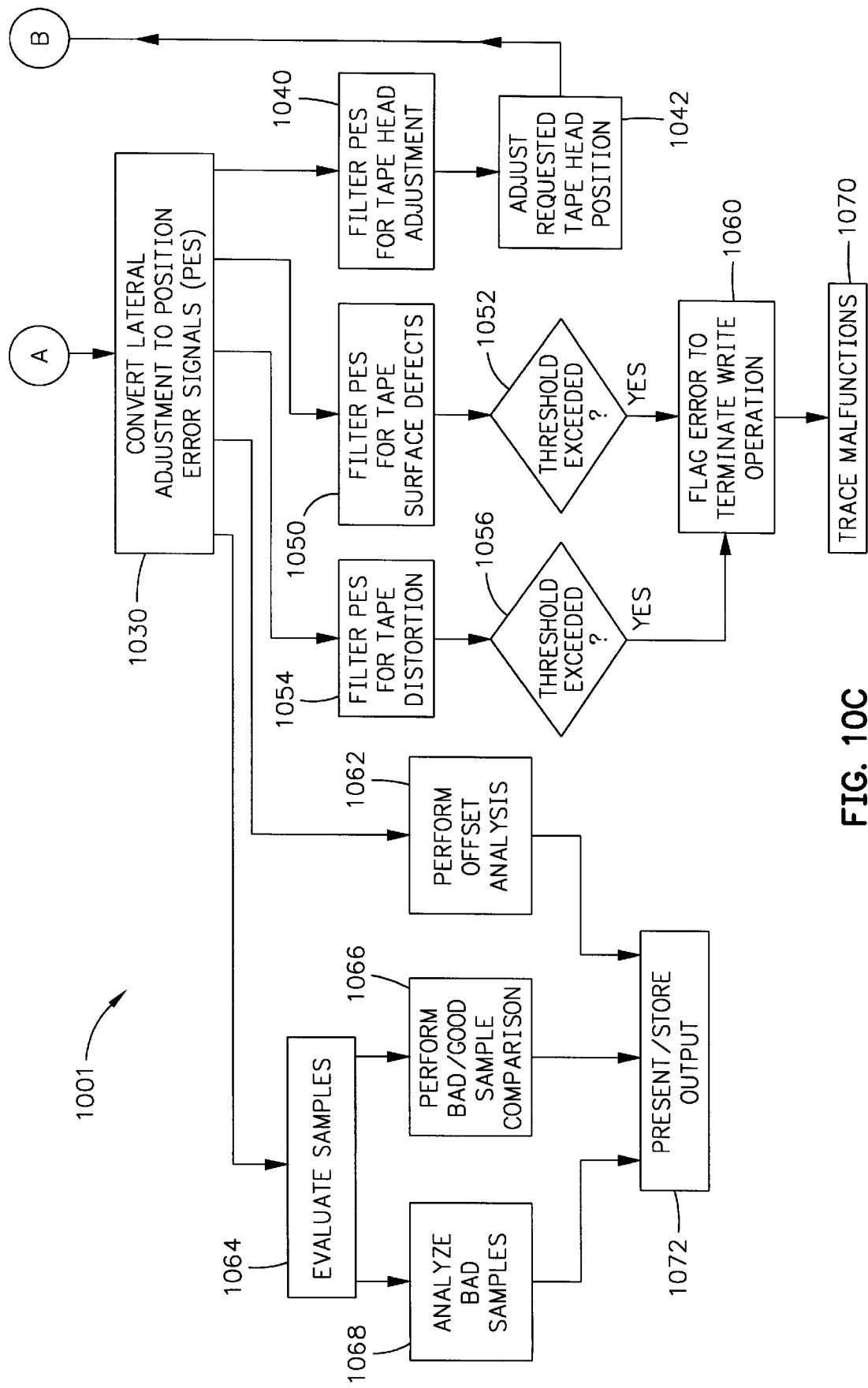

FIGS. 10B and C shows a sequence of method steps 1001 to illustrate one embodiment of the method aspect of the invention. For ease of explanation (but without any limitation intended thereby, the example of FIG. 10 is described in the context of the tape system of FIG. 1.

To correctly process information on a magnetic tape 117, the read-write element pairs 810, 812 contained within the tape head 308 must remain aligned with the longitudinal tracks 525 of the magnetic tape 117. Movements of the tape drive 110 frame and lateral slippage of the magnetic tape 117 may cause misalignment of the tape head 308. At step 1010, the position of the tape head 308 is kept fixed relative to the tape drive 110 frame. A positional sensor detects any movements of the tape drive 110 frame and signals the head actuator 223 to correspondingly position the tape head 308.

At step 1020, servo element pairs 814, 816 within the tape head 308 detect any lateral adjustments of the magnetic tape 117 as it travels by the tape head 308. At step 1030, the lateral positional adjustment detected in step 1020 is converted into position error signals (PES) 930.

The position error signals 930 are then filtered in step 1040 to keep the portion of the signal attributed to the movement of the magnetic tape 117, the portion of the signal used for adjustment of the tape head 308 position. This filtering step 1040 removes the high frequency noise and midrange frequency components from the position error signal 930. At step 1042, the requested head position 942 is adjusted according to the filtered position error signal from step 1040.

The position error signal 930 is also filtered in step 1054 to retain possible information about tape edge vibration and distortion along the magnetic tape 117. This filtering step 1054 differs from step 1040 in that it removes the high frequency noise but keeps the midrange frequency portion of the signal is then compared to a threshold at step 1056 to determine if an error exists. If the threshold is exceeded, step 1060 flags an error to terminate any current write operations to the magnetic tape 117.

After step 1060, an attempt is made in step 1070 to identify determine the source of the malfunction. More particularly, at step 1070 the malfunction tracer 960 receives from the PES converter 920 the PES 930, along with an identification of which of these samples are "bad". The malfunction tracer 960 evaluates the PES 930 in the given tape span to determine the source of malfunctions occurring in the servo system during that period. This process is discussed in greater detail below.

The sequence 1001 also includes a number of additional steps (1062–1072) performed after step 1030, for the purpose of detecting, monitoring, and evaluating ongoing servo performance. As shown in FIGS. 10B and C, these steps are performed without regard to whether a serious stop-write error (steps 1056, 1052, 1060) has occurred. Thus, the steps 1062–1072 are useful for recognizing the underlying signs of impending malfunctions, helping to catch errors before they occur.

At step 1062, the offset analyzer 952 receives and analyzes the PES 930 to evaluate the operation of the servo system. At step 1064, the PES converter 920 determines, for each sample of each of the PES 930, whether that sample meets certain predetermined criteria (as discussed above); otherwise, the sample is "bad".

At step 1066, the good/bad sample comparison unit 954 receives from the PES converter 920 the PES 930, along with an identification of which of these samples are "bad". Using this input information, the unit 954 determines the ratio between bad and total samples in a certain span of magnetic tape.

At step 1068, the bad sample analyzer 958 evaluates operation of the servo system by receiving the PES 930 and analyzing only the bad samples. As discussed in greater detail below, this may be performed by constructing a histogram indicating how many of each length of consecutive bad samples occurred in the span of tape.

After steps 1062, 1066, and 1068 create their respective analytical results, step 1072 stores or outputs the results, as desired.

The steps 1001 repeat continually during operation of the tape drive of the invention. Thus, during normal operation, the procedure 1001 does not end. Implicitly, however, an end step (not shown) is performed whenever the tape drive ceases to read or write data, due to a pause, rewind, fast-forward, power-down, or another appropriate condition.

Detailed Operation

The following description illustrates certain of the steps 1001 in greater detail, with the aid of specific examples.

Offset Analysis

As mentioned above, in the offset analysis step (1062) the offset analyzer 952 receives and analyzes the PES 930 to evaluate the operation of the servo system. In the illustrated embodiment, this evaluation considers both good and bad PES 930 alike. Preferably, the PES 930 are compiled to form a histogram, where the x-axis represents the range of PES 930 in microns, and the y-axis represents the number of PES 930 samples having the particular PES value indicated by the x-axis.

Figure 12:
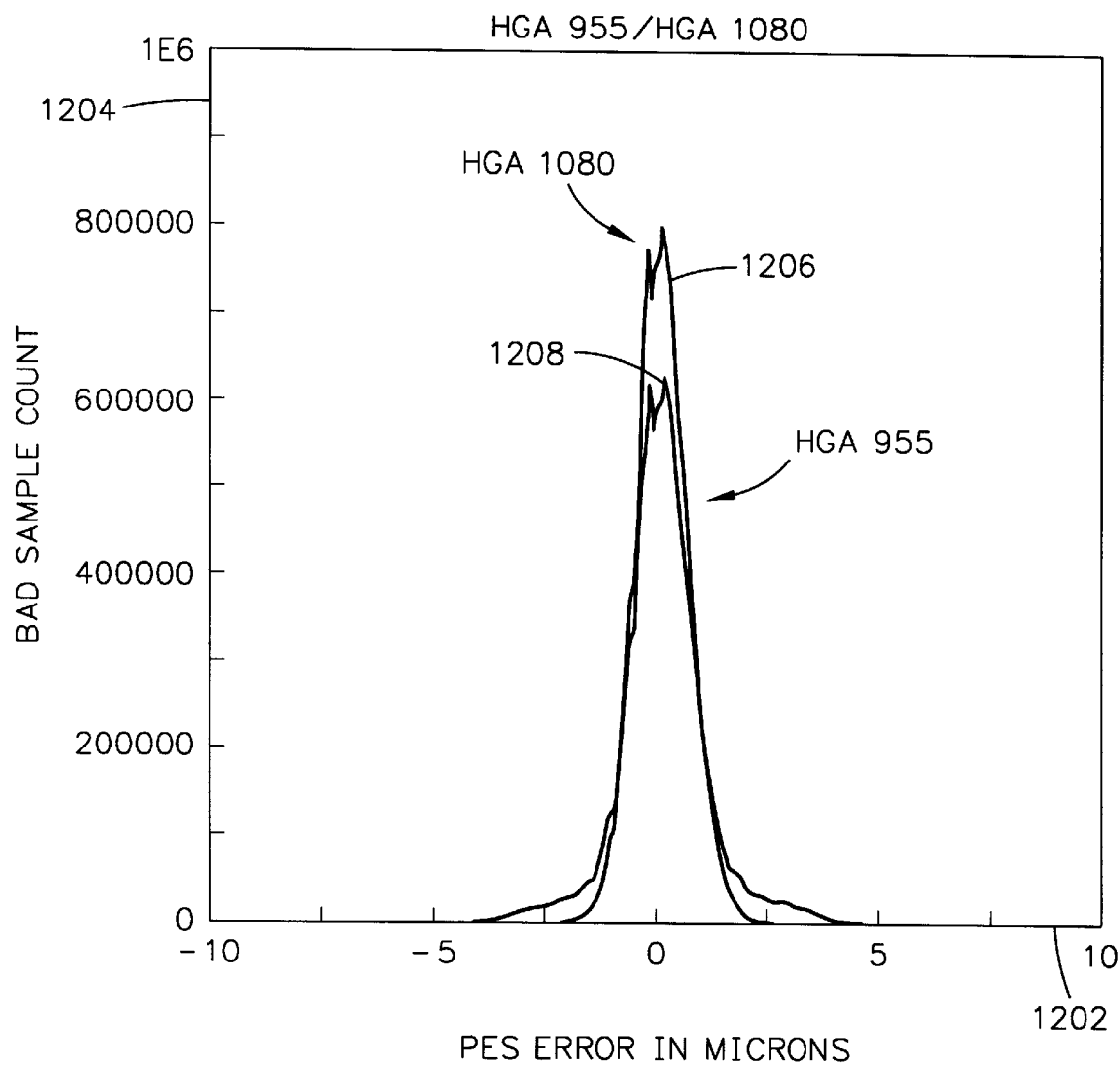
FIG. 12 is a graphical depiction of an exemplary output of an offset analyzer in accordance with the invention.

FIG. 12 shows exemplary histograms displaying offset analysis results. The x-axis 1202 represents the range of PES 930, from −10 to +10 microns. The y-axis 1204 represents the number of PES 930 samples having any particular PES value, from zero to 1,000,000.

FIG. 12 shows two curves: 1206 and 1208. These curves were taken using an IBM model 3590 Magstar tape drive, where the sampled span of magnetic tape corresponded to an entire tape length (rather than a "wrap half"). To analyze the curves 1206, 1208, the mean and standard deviation of the curves 1206, 1208 may be taken. Ideally, the mean value will be zero. In IBM model 3590 tape drives, the standard deviation should be less than 2.4 microns or PES errors will occur.

In the example of FIG. 12, the curve 1206 corresponds to a properly operating tape drive; the curve 1208 corresponds to a tape drive that was occasionally malfunctioning, although it had not yet generated any PES errors. Examination of the tape drive corresponding to the curve 1208 revealed that a head cable clamp was loose, permitting the cable to move and resulting in an unstable actuator loop in certain positions. The curve 1208 displays inferior performance relative to the curve 1206, shown as follows in Table 1.

TABLE 1

Comparison of Offset Histograms

|  | mean | standard deviation |
|---|---|---|
| curve 1206 | .35 micron | .69 micron |
| curve 1208 | .35 micron | 1.07 micron |

Bad/Good Sample Comparison

As mentioned above, in the bad/good sample comparison step (1066) the unit 954 receives the PES along with identification of which of these samples are "bad" from the PES converter 920 and uses this input information to determine the ratio between bad and total samples in a certain span of magnetic tape.

FIG. 13 shows an exemplary data set, taken with varying amounts of track offset, below, centered, and above the servo track. More particularly, block 1300 contains PES 930 corresponding to a six micron offset below the servo track. Summing all PES in the block 1300 and dividing by the number of mean bad samples (i.e., 129), yields a ratio of 5646. This value does not indicate any tendency for malfunction, since it exceeds a ratio of 200:1, which is desirable as discussed above.

Bad/good sample comparisons for the blocks 1302–1303 do not reveal any malfunctions, indicating ratios of 1498 and 258.5, both exceeding the 200:1 threshold.

Bad Sample Analysis

As mentioned above, in the bad sample analysis step (1068) the unit 958 receives the PES along with identification of which of these samples are "bad" from the PES converter 920, and evaluates operation of the servo system using just the bad samples. Preferably, the bad samples are compiled to form a histogram, where the x-axis represents various lengths of bad sample strings, and the y-axis represents the number of occurrences of each string.

Figure 14:
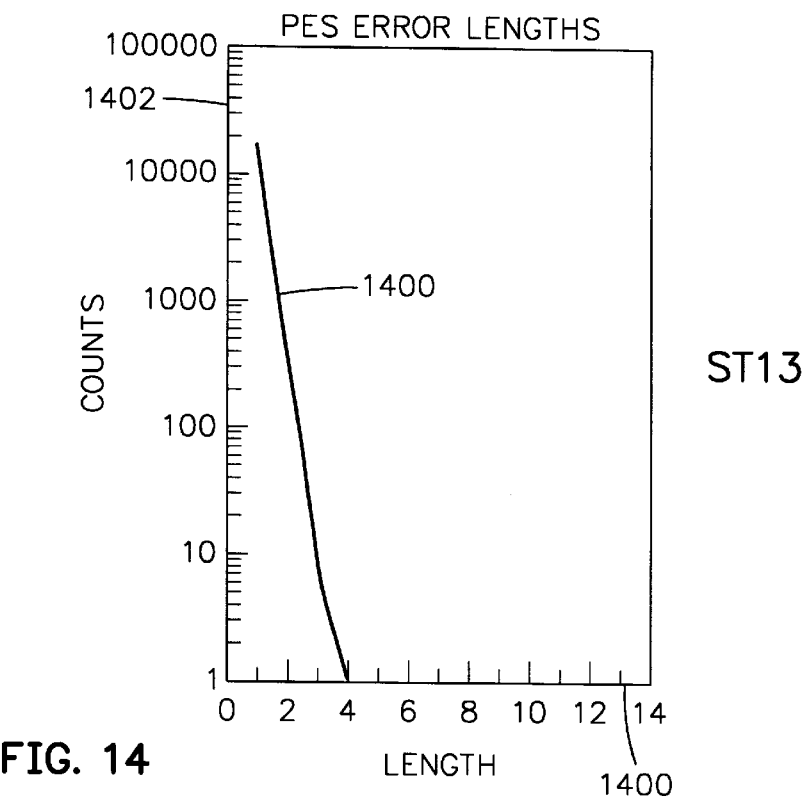
FIG. 14 is a graphical depiction of a first exemplary output of a bad sample analyzer in accordance with the invention.
Figure 15:
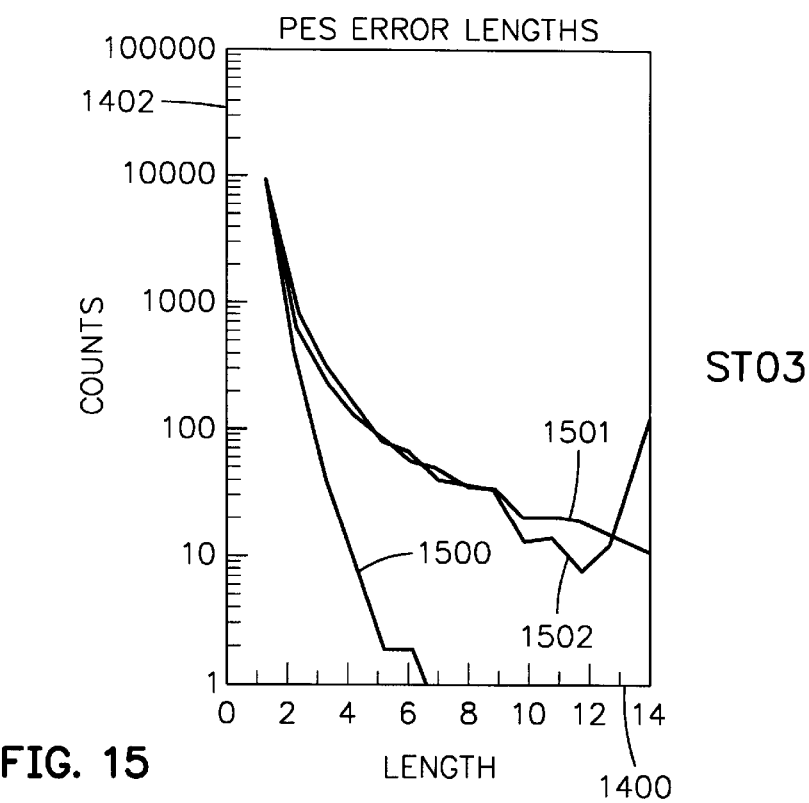
FIG. 15 is a graphical depiction of a second exemplary output of a bad sample analyzer in accordance with the invention.

FIGS. 14–15 show exemplary histograms 1400, 1500 displaying bad sample analysis results. These curves were taken using an IBM model 3590 Magstar tape drive, where the sampled span of magnetic tape corresponded to an entire tape length (as opposed to a "wrap half"). In each histogram, the x-axis 1400 represents the range of strings having consecutive bad samples, from zero to fourteen. Each y-axis 1402 represents the number of strings of bad samples of having any particular length indicated by the corresponding value of the x-axis 1400. All three PES 930 are plotted in each of the histograms.

The curve 1400 in FIG. 14 displays favorable characteristics: a generally monotonically decreasing slope, truncating at a value less than six consecutive errors. The maximum error length for the tape cartridge used in FIG. 14 was four samples. Each of the three PES are consistent with the others; this can be seen since the curve 1400 actually represents three PES curves that nearly exactly overlap each other.

The curves 1500–1502 in FIG. 15, however, displays unfavorable characteristics. The curves 1500–1502 correspond to PES-1, PES-2, and PES-3 signals. The curves 1501–1502 have extensive error lengths, including some strings of fourteen consecutive bad samples. Strings of even greater lengths may have actually occurred, since these histograms were limited to fourteen samples, and any longer errors were placed in to the category of fourteen samples. The curve 1502 indicates that this PES had several error lengths greater than fourteen samples, indicating that the servo write process may have been plagued with fades, debris, or other similar problems.

Malfunction Tracing

As mentioned above, in the malfunction tracing step (1070) the malfunction tracer 960 receives the PES 930 along with identification of which of these samples are "bad" from the PES converter 920. Unlike known servo systems, the malfunction tracer 960 uses the PES samples themselves to determine the source of malfunctions occurring in the tape drive. Known servo systems simply indicate when a servo error has occurred, failing to provide any diagnostic information about the error or its possible source.

Preferably, the malfunction tracing step 1070 operates by determining whether certain predetermined criteria are met, each criteria corresponding to the conditions of a certain type of malfunction. This may be accomplished, according to one embodiment, by utilizing the known "ANOVA" (Analysis of Variants) technique, which is discussed in Ronald E. Walpole & Raymond H. Myers, "Probability and Statistics for Engineers and Scientists", 3 Ed., pp. 407–470 (Chap. 11). As mentioned above, the PES processing unit 917 may be implemented by a digital signal processor or another suitable logic or processing unit. To explain the malfunction tracing step 1070 in greater detail, a number of different related queries are discussed below.

A. Servo Circuitry Problems

Defects in the servo circuitry will likely manifest themselves equally in samples of all servo elements, e.g., S1, S2, S3, and S4 (Table 3), rather than just S1 and S2 or S2 and S3. Therefore, if PES samples from all servo elements are defective, further debugging should be conducted in the servo circuitry, rather than the head, media, or other places.

TABLE 3

Data Indicating Servo Circuitry Problem

| Bad Samples | S1, S2, S3, and S4 |
| --- | --- |

B. Tape Head Problems

If one servo element consistently generates bad samples while other servo elements perform properly, this shows that the single servo element is probably defective. Table 4 illustrates an example of this condition. In this example, the low and high servo edges are apparently defect-free because the servo element S1 can successfully read them. Thus, the source of the bad samples can be attributed to the servo element S2.

If PES samples from one servo element are defective, then, further debugging should be conducted in the tape head, and more particularly in the servo element producing the defective samples.

TABLE 4

Data Indicating Servo Element Problem

| Bad Samples | S2 Low Edge, S2 High Edge |
| --- | --- |
| Good Samples | S1 Low Edge, S1 High Edge |

C. Media Problems

In contrast to the malfunctions described above, a servo edge defect is indicated when both laterally aligned servo elements produce good samples on one servo edge, but produce bad samples on the other servo edge. Table 5 (below) illustrates an example of this condition. In this example, the defect cannot be attributed to S1 or S2, since both servo elements function properly when tracking the upper servo edge. Thus, the source of the bad samples can be attributed to the lower servo edge.

If PES samples from two laterally-aligned servo elements are only defective one particular servo track, then, further debugging should be focused on the media, rather than the tape head or servo circuitry.

TABLE 5

Data Indicating Servo Edge Problem

| Bad Samples | S1 Low Edge, S2 Low Edge |
| --- | --- |
| Good Samples | S1 High Edge, S2 High Edge |

Evaluation of Tape Media

According to another aspect of the invention, the principles discussed above may be applied to conduct quality evaluations of tape media. This method may be applied, for instance, to rank factory-new tape media (such as tape cartridges) and then place the media in categories ("bins") according to their rankings. Advantageously, the media may then be sold at different prices corresponding to their rankings, or sold to different customers according to each customer's media performance requirements.

Figure 16:
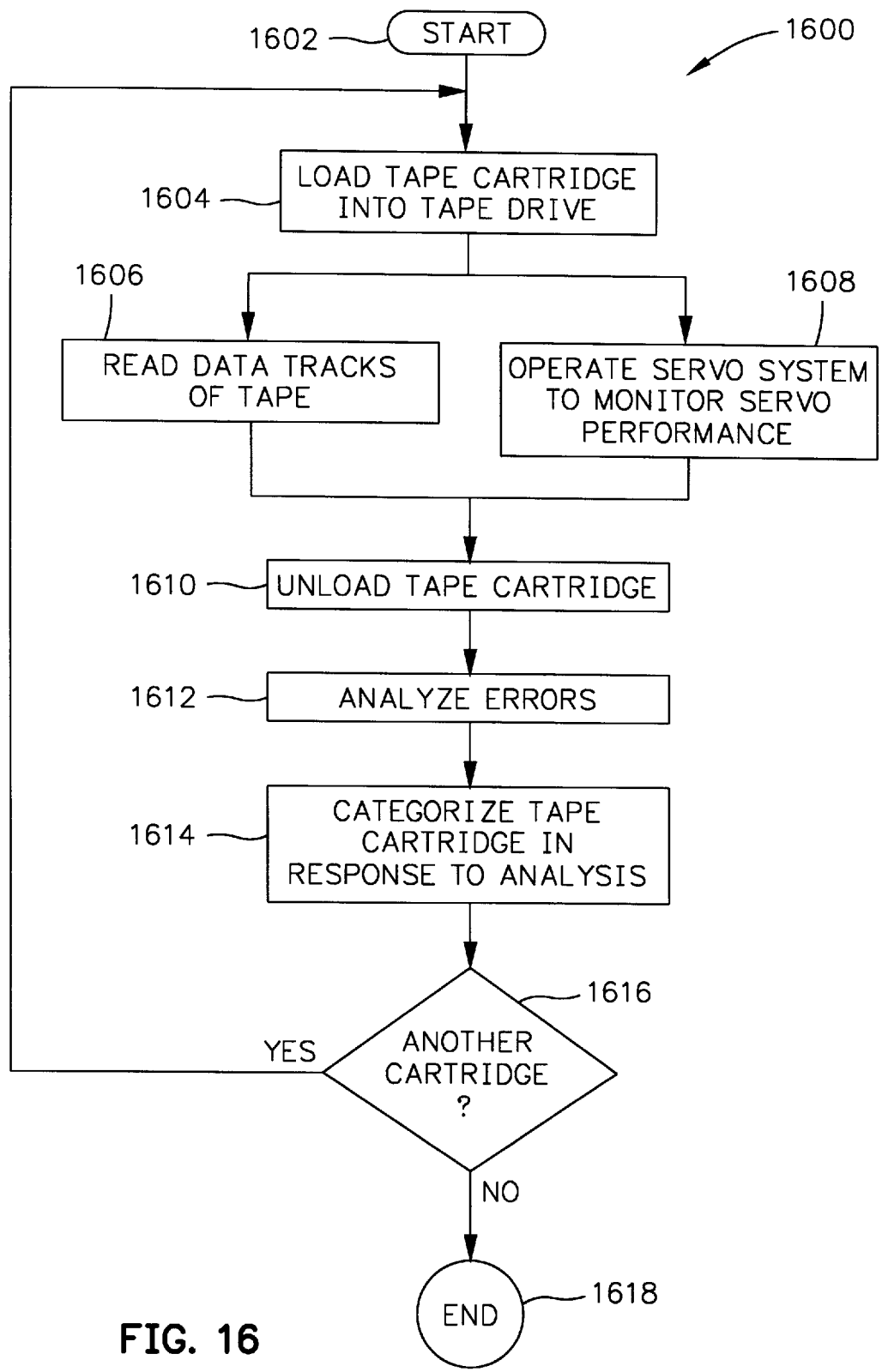
FIG. 16 is a flowchart illustrating an exemplary method for "ranking" tape media in accordance with the invention.

FIG. 16 depicts an illustrative media evaluation sequence 1600. For ease of explanation, this sequence is illustrated in the context of the tape drive and tape cartridge of FIGS. 1–2. After the sequence 1600 begins in step 1602, the tape media is loaded into the drive in step 1604. In steps 1606–1608 the tape drive reads the tape media's data tracks, while the servo system monitors servo performance (as discussed above). During step 1608, the servo system uses the storage/output unit 964 to store or output its results.

After the desired servo tracks are evaluated, the tape cartridge is unloaded in step 1610. In step 1612, results from the storage/output unit 964 are analyzed, and the tape is placed in an appropriate category in step 1614. As one example, such categories may be as simple as "good" and "bad" overall ratings, which consider a combined measure of bad/good sample ratio, bad sample lengths, and offset distribution. Alternatively, these rankings may employ more elaborate quality rankings, where separate rankings are provided in different categories, e.g. bad/good sample ratio, bad sample lengths, and offset distribution. Still further, the rankings may be weighted if desired, to place specific emphasis on certain performance characteristics, e.g. bad/good sample ratio.

After the last tape is ranked in step 1614, query 1616 asks whether another tape cartridge remains to be processed. If so, control returns to step 1604 to start again. Otherwise, the program 1600 ends in step 1618.

Other Embodiments

While there have been shown what are presently considered to be preferred embodiments of the invention, it will be apparent to those skilled in the art that various changes and modifications can be made herein without departing from the scope of the invention as defined by the appended claims.

What is claimed is:

1. A method for servo monitoring in a tape drive having a frame, a tape head for accessing data on a magnetic tape, and an actuator for positioning said tape head, said tape head having read elements for reading data from said magnetic tape, write elements for writing data to said magnetic tape, and multiple servo elements each for detecting a lateral position of said servo element relative to a corresponding track on said magnetic tape, said method comprising the steps of:

as the magnetic tape longitudinally travels past the tape head, operating the servo elements at predetermined times to sense corresponding servo tracks and generate first, second, and third PES sample signals representative of any offset between the servo elements and their corresponding servo tracks;

for a predetermined span of the magnetic tape, generating a first machine-readable record of all first, second, and third PES sample signals;

for each of the first, second, and third PES sample signals corresponding to the predetermined span of the magnetic tape, classifying each PES sample signal as bad if it exceeds a predetermined threshold, and generating a second machine-readable record indicating, for each time a bad PES sample signal occurs, how many successive PES sample signals are also bad; and generating a third machine-readable record of a relationship between bad PES sample signals and total PES sample signals in the predetermined span of magnetic tape.

2. The method of claim 1, the predetermined span of magnetic tape comprising a wrap half of the magnetic tape.

3. The method of claim 1, the predetermined span of magnetic tape comprising a track of the magnetic tape.

4. The method of claim 1, further comprising the steps of:

graphically depicting the PES sample signals of the first machine-readable record in a histogram where a first axis represents values of PES sample signals and a second axis represents numbers of occurrences of each value of PES sample signal; and applying predetermined criteria to at least one of the following attributes of the graphical depiction: a mean, a standard deviation, and an overall shape.

5. The method of claim 1, further comprising the steps of:

graphically depicting the bad PES sample signals of the second machine-readable record in a histogram where a first axis represents a number of successively bad PES sample signals, and a second axis represents a number of occurrences of each number of successively bad PES sample signals;

applying predetermined criteria to the graphical depiction.

6. The method of claim 1, further comprising the steps of:

determining whether the relationship between bad PES sample signals and total PES sample signals in the third machine-readable record exceeds a predetermined threshold.

7. The method of claim 1, the magnetic tape being configured in a tape cartridge format.

8. The method of claim 1, the magnetic tape being configured in a reel-to-reel format.

9. A method for servo monitoring in a tape drive having a frame, a tape head for accessing data on a magnetic tape, and an actuator for positioning said tape head, said tape head having read elements for reading data from said magnetic tape, write elements for writing data to said magnetic tape, and multiple servo elements each for detecting a lateral position of said servo element relative to a corresponding track on said magnetic tape, said multiple servo elements including longitudinally aligned S1 and S2 elements, said multiple servo elements also including longitudinally aligned S3 and S4 elements laterally displaced from S1 and S2, said method comprising the steps of:

as the magnetic tape longitudinally travels past the tape head, operating each servo element at predetermined times to sense corresponding servo tracks and generate a PES sample signal representative of any offset between the servo element and its respective servo track;

for a predetermined span of the magnetic tape, generating a first machine-readable record of the PES sample signals of S1, S2, S3, and S4;

classifying each PES sample signal as bad if it exceeds a predetermined threshold, and generating a second machine-readable record indicating, for each time a bad PES sample signal occurs, how many successive PES sample signals are also bad;

generating a third machine-readable record indicating a relationship between numbers of bad PES sample signals and total PES sample signals in each of the first machine-readable records;

graphically depicting the PES sample signals of the first machine-readable record in a first graphical depiction where a first axis represents values of PES sample signals and a second axis represents numbers of occurrences of each value of PES sample signal;

applying first predetermined criteria to at least one of the following attributes of the first graphical depiction: a mean, a standard deviation, and an overall shape;

graphically depicting the bad PES sample signals of the second machine-readable record in a histogram where a first axis represents a number of successively bad PES sample signals, and a second axis represents a number of occurrences of each number of successively bad PES sample signals;

applying second predetermined criteria to the graphical depiction; and applying third predetermined criteria by determining whether the relationship between bad PES sample signals and total PES sample signals in the third machine-readable record exceeds a predetermined threshold.

10. The method of claim 9, further comprising steps of analyzing servo performance to diagnose servo problems by performing steps comprising:

determining whether a defect exists in circuitry of the tape drive by determining whether each of S1, S2, S3, and S4 fail to satisfy at least one of the first, second, and third predetermined criteria.

11. The method of claim 9, further comprising steps of analyzing servo performance to diagnose servo problems by performing steps comprising:

determining whether a defect exists in an individual servo element by determining whether position error signals produced by that servo element fail to satisfy at least one of the first, second, and third predetermined criteria when reading upper and lower edges while position error signals produced by the longitudinally aligned servo element satisfy the first, second, and third criteria when reading upper or lower edges.

12. The method of claim 9, further comprising steps of analyzing servo performance to diagnose servo problems by performing steps comprising:

determining whether a defect exists in a servo edge by determining whether position error signals produced by longitudinally aligned servo elements fail to satisfy at least one of the first, second, and third predetermined criteria when reading that servo edge while position error signals produced by the longitudinally aligned servo elements satisfy the first, second, and third criteria when reading other servo edges.

13. A method for evaluating magnetic tape for use in a tape drive having a frame, a tape head for accessing data on a loaded magnetic tape, and an actuator for positioning said tape head, said tape head having read elements for reading data from said magnetic tape, write elements for writing data to said magnetic tape, and multiple servo elements each for detecting a lateral position of said servo element relative to a corresponding track on said loaded magnetic tape, said method comprising the steps of:

(a) loading a first magnetic tape into the tape drive;

(b) as the magnetic tape longitudinally travels past the tape head, operating the servo elements at predetermined times to sense corresponding servo tracks and generate first, second, and third PES sample signals representative of any offset between the servo elements and their corresponding servo tracks;

(c) for a predetermined span of the magnetic tape, generating a first machine-readable record of all first, second, and third PES sample signals;

(d) for each of the first, second, and third PES sample signals corresponding to the predetermined span of the magnetic tape, classifying each PES sample signal as bad if it exceeds a predetermined threshold, and generating a second machine-readable record indicating, for each time a bad PES sample signal occurs, how many successive PES sample signals are also bad;

(e) generating a third machine-readable record of a relationship between bad PES sample signals and total PES sample signals in the predetermined span of magnetic tape;

(f) applying predetermined criteria to at least one of the first, second, and third machine-readable records to yield a ranking of the magnetic tape;

(g) performing the following steps at least one time:
unloading the loaded magnetic tape;
loading a new magnetic tape into the tape drive; and
repeating steps (a) through (f) for the new magnetic tape.

14. The method of claim 13, the steps of applying predetermined criteria to at least one of the first, second, and third machine-readable records to yield a ranking of the magnetic tape comprising the steps of:

responsive to at least one of the first, second, and third machine-readable records for the magnetic tape, assigning one of multiple predetermined rankings to that magnetic tape.

15. The method of claim 13, wherein each of the magnetic tapes is factory new.

16. The method of claim 15, the magnetic tape being configured in a tape cartridge format.

17. The method of claim 15, the magnetic tape being configured in a reel-to-reel format.

18. The method of claim 13, the step of applying predetermined criteria to at least one of the first, second, and third machine-readable records to yield a ranking of the magnetic tape comprising the steps of:

graphically depicting the PES sample signals of the first machine-readable record in a histogram where a first axis represents values of PES sample signals and a second axis represents numbers of occurrences of each value of PES sample signal; and applying predetermined criteria to at least one of the following attributes of the graphical depiction: a mean, a standard deviation, and an overall shape.

19. The method of claim 13, the step of applying predetermined criteria to at least one of the first, second, and third machine-readable records to yield a ranking of the magnetic tape comprising the steps of:

graphically depicting the bad PES sample signals of the second machine-readable record in a histogram where a first axis represents a number of successively bad PES sample signals, and a second axis represents a number of occurrences of each number of successively bad PES sample signals;

applying predetermined criteria to the graphical depiction.

20. The method of claim 13, the step of applying predetermined criteria to at least one of the first, second, and third machine-readable records to yield a ranking of the magnetic tape comprising the steps of:

determining whether the relationship between bad PES sample signals and total PES sample signals in the third machine-readable record exceeds a predetermined threshold.

21. A program storage device readable by a processor and tangibly embodying a program of instructions executable by the processor to perform method steps for servo monitoring in a tape drive having a frame, a tape head for accessing data on a magnetic tape, and an actuator for positioning said tape head, said tape head having read elements for reading data from said magnetic tape, write elements for writing data to said magnetic tape, and multiple servo elements each for detecting a lateral position of said servo element relative to a corresponding track on said magnetic tape, said method steps comprising:

as the magnetic tape longitudinally travels past the tape head, operating the servo elements at predetermined times to sense corresponding servo tracks and generate first, second, and third PES sample signals representative of any offset between the servo elements and their corresponding servo tracks;

for a predetermined span of the magnetic tape, generating a first machine-readable record of all first, second, and third PES sample signals;

for each of the first, second, and third PES sample signals corresponding to the predetermined span of the magnetic tape, classifying each PES sample signal as bad if it exceeds a predetermined threshold, and generating a second machine-readable record indicating, for each time a bad PES sample signal occurs, how many successive PES sample signals are also bad; and generating a third machine-readable record of a relationship between bad PES sample signals and total PES sample signals in the predetermined span of magnetic tape.

22. The program storage device of claim 21, the predetermined span of magnetic tape comprising a wrap half of the magnetic tape.

23. The program storage device of claim 21, the predetermined span of magnetic tape comprising a track of the magnetic tape.

24. The program storage device of claim 21, the method steps further comprising:

graphically depicting the PES sample signals of the first machine-readable record in a histogram where a first axis represents values of PES sample signals and a second axis represents numbers of occurrences of each value of PES sample signal; and applying predetermined criteria to at least one of the following attributes of the graphical depiction: a mean, a standard deviation, and an overall shape.

25. The program storage device of claim 21, the method steps further comprising:

graphically depicting the bad PES sample signals of the second machine-readable record in a histogram where a first axis represents a number of successively bad PES sample signals, and a second axis represents a number of occurrences of each number of successively bad PES sample signals;

applying predetermined criteria to the graphical depiction.

26. The program storage device of claim 21, the method steps further comprising:

determining whether the relationship between bad PES sample signals and total PES sample signals in the third machine-readable record exceeds a predetermined threshold.

27. The program storage device of claim 21, the magnetic tape being configured in a tape cartridge format.

28. The program storage device of claim 21, the magnetic tape being configured in a reel-to-reel format.

29. A program storage device readable by a processor and tangibly embodying a program of instructions executable by the processor to perform method steps for servo monitoring in a tape drive having a frame, a tape head for accessing data on a magnetic tape, and an actuator for positioning said tape head, said tape head having read elements for reading data from said magnetic tape, write elements for writing data to said magnetic tape, and multiple servo elements each for detecting a lateral position of said servo element relative to a corresponding track on said magnetic tape, said multiple servo elements including longitudinally aligned S1 and S2 elements, said multiple servo elements also including longitudinally aligned S3 and S4 elements laterally displaced from S1 and S2, said method steps comprising:

as the magnetic tape longitudinally travels past the tape head, operating each servo element at predetermined times to sense corresponding servo tracks and generate a PES sample signal representative of any offset between the servo element and its respective servo track;

for a predetermined span of the magnetic tape, generating a first machine-readable record of the PES sample signals of S1, S2, S3, and S4;

classifying each PES sample signal as bad if it exceeds a predetermined threshold, and generating a second machine-readable record indicating, for each time a bad PES sample signal occurs, how many successive PES sample signals are also bad;

generating a third machine-readable record indicating a relationship between numbers of bad PES sample signals and total PES sample signals in each of the first machine-readable records;

graphically depicting the PES sample signals of the first machine-readable record in a first graphical depiction where a first axis represents values of PES sample signals and a second axis represents numbers of occurrences of each value of PES sample signal;

applying first predetermined criteria to at least one of the following attributes of the first graphical depiction: a mean, a standard deviation, and an overall shape;

graphically depicting the bad PES sample signals of the second machine-readable record in a histogram where a first axis represents a number of successively bad PES sample signals, and a second axis represents a number of occurrences of each number of successively bad PES sample signals;

applying second predetermined criteria to the graphical depiction; and applying third predetermined criteria by determining whether the relationship between bad PES sample signals and total PES sample signals in the third machine-readable record exceeds a predetermined threshold.

30. The program storage device of claim 29, the method steps further comprising analyzing servo performance to diagnose servo problems by:

determining whether a defect exists in circuitry of the tape drive by determining whether each of S1, S2, S3, and S4 fail to satisfy at least one of the first, second, and third predetermined criteria.

31. The program storage device of claim 29, the method steps further comprising analyzing servo performance to diagnose servo problems by:

determining whether a defect exists in an individual servo element by determining whether position error signals produced by that servo element fail to satisfy at least one of the first, second, and third predetermined criteria when reading upper and lower edges while position error signals produced by the longitudinally aligned servo element satisfy the first, second, and third criteria when reading upper or lower edges.

32. The program storage device of claim 29, the method steps further comprising analyzing servo performance to diagnose servo problems by:

determining whether a defect exists in a servo edge by determining whether position error signals produced by longitudinally aligned servo elements fail to satisfy at least one of the first, second, and third predetermined criteria when reading that servo edge while position error signals produced by the longitudinally aligned servo elements satisfy the first, second, and third criteria when reading other servo edges.

33. A program storage device readable by a processor and tangibly embodying a program of instructions executable by the processor to perform method steps for evaluating magnetic tape for use in a tape drive having a frame, a tape head for accessing data on a loaded magnetic tape, and an actuator for positioning said tape head, said tape head having read elements for reading data from said magnetic tape, write elements for writing data to said magnetic tape, and multiple servo elements each for detecting a lateral position of said servo element relative to a corresponding track on said loaded magnetic tape, said method steps comprising:

(a) loading a first magnetic tape into the tape drive;

(b) as the magnetic tape longitudinally travels past the tape head, operating the servo elements at predetermined times to sense corresponding servo tracks and generate first, second, and third PES sample signals representative of any offset between the servo elements and their corresponding servo tracks;

(c) for a predetermined span of the magnetic tape, generating a first machine-readable record of all first, second, and third PES sample signals;

(d) for each of the first, second, and third PES sample signals corresponding to the predetermined span of the magnetic tape, classifying each PES sample signal as bad if it exceeds a predetermined threshold, and generating a second machine-readable record indicating, for each time a bad PES sample signal occurs, how many successive PES sample signals are also bad;

(e) generating a third machine-readable record of a relationship between bad PES sample signals and total PES sample signals in the predetermined span of magnetic tape;

(f) applying predetermined criteria to at least one of the first, second, and third machine-readable records to yield a ranking of the magnetic tape;

(g) performing the following steps at least one time:
unloading the loaded magnetic tape;
loading a new magnetic tape into the tape drive; and
repeating steps (a) through (f) for the new magnetic tape.

34. The program storage device of claim 33, applying predetermined criteria to at least one of the first, second, and third machine-readable records to yield a ranking of the magnetic tape comprising:

responsive to at least one of the first, second, and third machine-readable records for the magnetic tape, assigning one of multiple predetermined rankings to that magnetic tape.

35. The program storage device of claim 33, wherein each of the magnetic tapes is factory new.

36. The program storage device of claim 35, the magnetic tape being configured in a tape cartridge format.

37. The program storage device of claim 35, the magnetic tape being configured in a reel-to-reel format.

38. The program storage device of claim 33, applying predetermined criteria to at least one of the first, second, and third machine-readable records to yield a ranking of the magnetic tape comprising:

graphically depicting the PES sample signals of the first machine-readable record in a histogram where a first axis represents values of PES sample signals and a second axis represents numbers of occurrences of each value of PES sample signal; and applying predetermined criteria to at least one of the following attributes of the graphical depiction: a mean, a standard deviation, and an overall shape.

39. The program storage device of claim 33, applying predetermined criteria to at least one of the first, second, and third machine-readable records to yield a ranking of the magnetic tape comprising:

graphically depicting the bad PES sample signals of the second machine-readable record in a histogram where a first axis represents a number of successively bad PES sample signals, and a second axis represents a number of occurrences of each number of successively bad PES sample signals;

applying predetermined criteria to the graphical depiction.

40. The program storage device of claim 33, applying predetermined criteria to at least one of the first, second, and third machine-readable records to yield a ranking of the magnetic tape comprising:

determining whether the relationship between bad PES sample signals and total PES sample signals in the third machine-readable record exceeds a predetermined threshold.

41. A tape drive, comprising:

a multi-track head including multiple servo elements and multiple/read write elements;

an actuator coupled to the head to position the head in response to head position input signals;

a data channel coupled to the read/write elements to exchange data signals with the read/write elements; and a servo channel, said servo channel including:
a PES unit, coupled to the servo elements, operable as the magnetic tape longitudinally travels past the tape head to direct the servo elements at predetermined times to sense corresponding servo tracks and generate first, second, and third PES sample signals representative of any offset between the servo elements and their corresponding servo tracks, said PES unit classifying each PES sample signal as bad if it exceeds a predetermined threshold;

a bad sample analyzer programmed to generate a second machine-readable record indicating, for each time a bad PES sample signal occurs, how many successive PES sample signals are also bad; and generate a third machine-readable record of a relationship between bad PES sample signals and total PES sample signals in the predetermined span of magnetic tape.

42. The apparatus of claim 41, the predetermined span of magnetic tape comprising a wrap half of the magnetic tape.

43. The apparatus of claim 41, the predetermined span of magnetic tape comprising a track of the magnetic tape.

44. The apparatus of claim 41, further comprising an offset analyzer programmed to graphically depict the PES sample signals of the first machine-readable record in a histogram where a first axis represents values of PES sample signals and a second axis represents numbers of occurrences of each value of PES sample signal, and to apply predetermined criteria to at least one of the following attributes of the graphical depiction: a mean, a standard deviation, and an overall shape.

45. The apparatus of claim 41, the bad sample analyzer further being programmed to graphically depict the bad PES sample signals of the second machine-readable record in a histogram where a first axis represents a number of successively bad PES sample signals, and a second axis represents a number of occurrences of each number of successively bad PES sample signals, and apply predetermined criteria to the graphical depiction.

46. The apparatus of claim 41, the bad sample analyzer further being programmed to determine whether the relationship between bad PES sample signals and total PES sample signals in the third machine-readable record exceeds a predetermined threshold.

47. The apparatus of claim 41, the magnetic tape being configured in a tape cartridge format.

48. The apparatus of claim 41, the magnetic tape being configured in a reel-to-reel format.

49. An apparatus for servo monitoring in a tape drive having a frame, a tape head for accessing data on a magnetic tape, and an actuator for positioning said tape head, said tape head having read elements for reading data from said magnetic tape, write elements for writing data to said magnetic tape, and multiple servo elements each for detecting a lateral position of said servo element relative to a corresponding track on said magnetic tape, said multiple servo elements including longitudinally aligned S1 and S2 elements, said multiple servo elements also including longitudinally aligned S3 and S4 elements laterally displaced from S1 and S2, said apparatus comprising:

a multi-track head including multiple servo elements and multiple/read write elements;

an actuator coupled to the head to position the head in response to head position input signals;

a data channel coupled to the read/write elements to exchange data signals with the read/write elements; and a servo channel, said servo channel including:

a PES unit, operable as the magnetic tape longitudinally travels past the tape head to direct each servo element at predetermined times to sense corresponding servo tracks and generate a PES sample signal representative of any offset between the servo element and its respective servo track;

an offset analyzer programmed to generate a first machine-readable record of the PES sample signals of S1, S2, S3, and S4, to graphically depict the PES sample signals of the first machine-readable record in a first graphical depiction where a first axis represents values of PES sample signals and a second axis represents numbers of occurrences of each value of PES sample signal, and to apply first predetermined criteria to at least one of the following attributes of the first graphical depiction: a mean, a standard deviation, and an overall shape;

a bad sample analyzer programmed to classify each PES sample signal as bad if it exceeds a predetermined threshold and generate a second machine-readable record indicating, for each time a bad PES sample signal occurs, how many successive PES sample signals are also bad, and to graphically depict the bad PES sample signals of the second machine-readable record in a histogram where a first axis represents a number of successively bad PES sample signals, and a second axis represents a number of occurrences of each number of successively bad PES sample signals, and to apply second predetermined criteria to the graphical depiction;

a sample comparison unit programmed to generate a third machine-readable record indicating a relationship between numbers of bad PES sample signals and total PES sample signals in each of the first machine-readable records, and to apply third predetermined criteria by determining whether the relationship between bad PES sample signals and total PES sample signals in the third machine-readable record exceeds a predetermined threshold.

50. The apparatus of claim 49, further comprising a malfunction tracer programmed to determine whether a defect exists in circuitry of the tape drive by determining whether each of S1, S2, S3, and S4 fail to satisfy at least one of the first, second, and third predetermined criteria.

51. The apparatus of claim 49, further comprising a malfunction tracer programmed to determine whether a defect exists in an individual servo element by determining whether position error signals produced by that servo element fail to satisfy at least one of the first, second, and third predetermined criteria when reading upper and lower edges while position error signals produced by the longitudinally aligned servo element satisfy the first, second, and third criteria when reading upper or lower edges.

52. The apparatus of claim 49, further comprising a malfunction tracer programmed to determine whether a defect exists in a servo edge by determining whether position error signals produced by longitudinally aligned servo elements fail to satisfy at least one of the first, second, and third predetermined criteria when reading that servo edge while position error signals produced by the longitudinally aligned servo elements satisfy the first, second, and third criteria when reading other servo edges.

* * * * *

UNITED STATES PATENT AND TRADEMARK OFFICE
CERTIFICATE OF CORRECTION

PATENT NO.   :   5,872,672
DATED        :   February 16, 1999
INVENTOR(S)  :   Chliwnyj It is certified that error appears in the above-identified patent and that said Letters Patent is hereby corrected as shown below:

Column 26, line 23, insert --apparatus-- after "A tape drive"

Signed and Sealed this

Twentieth Day of July, 1999

Attest:

Attesting Officer

Q. TODD DICKINSON

Acting Commissioner of Patents and Trademarks